(12) United States Patent
Ramani et al.

(10) Patent No.: US 12,524,125 B2
(45) Date of Patent: Jan. 13, 2026

(54) AUGMENTED REALITY SYSTEM AND METHOD FOR COLLECTING CUSTOM DATASETS FOR 3D HAND-OBJECT INTERACTION POSE ESTIMATION

(71) Applicant: Purdue Research Foundation, West Lafayette, IN (US)

(72) Inventors: Karthik Ramani, West Lafayette, IN (US); Xun Qian, West Lafayette, IN (US); Tianyi Wang, West Lafayette, IN (US); Fengming He, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 351 days.

(21) Appl. No.: 18/480,134

(22) Filed: Oct. 3, 2023

(65) Prior Publication Data

US 2024/0118786 A1    Apr. 11, 2024

Related U.S. Application Data

(60) Provisional application No. 63/378,137, filed on Oct. 3, 2022.

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS

2019/0236344 A1\* 8/2019 Chen .................. G06F 18/214
2019/0370606 A1\* 12/2019 Kehl .................. G06F 18/217
(Continued)

OTHER PUBLICATIONS

Qian, X., He, F., Hu, X., Wang, T., & Ramani, K. (Oct. 29, 2022). Arnnotate: An augmented reality interface for collecting custom dataset of 3d hand-object interaction pose estimation. Retrieved from https://dl.acm.org/doi/pdf/10.1145/3526113.3545663. (Year: 2022).\*

(Continued)

*Primary Examiner* — Linda Huynh
(74) *Attorney, Agent, or Firm* — Maginot, Moore & Beck LLP

(57) ABSTRACT

A method and system for hand-object interaction dataset collection is described herein, which is configured to support user-specified collection of hand-object interaction datasets. Such hand-object interaction datasets are useful, for example, for training 3D hand and object pose estimation model. The method and system adopt a sequential process of first recording hand and object pose labels by manipulating a virtual bounding box, rather than a physical object. Naturally, hand-object occlusions do not occur during the manipulation of the virtual bounding box, so these labels are provided with high accuracy. Subsequently, the images are separately captured of the hand-object interaction with the physical object. These images are paired with the previously recorded hand and object pose labels.

20 Claims, 20 Drawing Sheets

(51) Int. Cl.
G06F 3/04842 (2022.01)
G06F 3/04845 (2022.01)
G06T 7/73 (2017.01)
(52) U.S. Cl.
CPC ...... *G06F 3/04842* (2013.01); *G06F 3/04845* (2013.01); *G06T 7/74* (2017.01)

(56) References Cited

U.S. PATENT DOCUMENTS

| | | | | |
|---|---|---|---|---|
| 2020/0211243 | A1* | 7/2020 | Ulusoy | G06T 11/60 |
| 2020/0302634 | A1* | 9/2020 | Pollefeys | G06T 7/70 |
| 2021/0122045 | A1* | 4/2021 | Handa | B25J 13/084 |
| 2021/0383096 | A1* | 12/2021 | White | G06V 20/64 |
| 2022/0301304 | A1* | 9/2022 | Hampali | G06N 3/045 |
| 2023/0038709 | A1* | 2/2023 | Ramani | G06F 3/017 |
| 2023/0068660 | A1* | 3/2023 | Brent | G06F 9/453 |
| 2024/0046568 | A1* | 2/2024 | Shreve | G06T 17/20 |
| 2025/0124671 | A1* | 4/2025 | Ramani | G06V 10/764 |

OTHER PUBLICATIONS

Hampali, S., Rad, M., Oberweger, M., & Lepetit, V. (Jun. 13, 2020). HOnnotate: A Method for 3D Annotation of Hand and Object Poses. Retrieved from https://openaccess.thecvf.com/content_CVPR_2020/papers/Hampali_HOnnotate_A_Method_for_3D_Annotation_of_Hand_and_Object_CVPR_2020_paper.pdf. (Year: 2020).*
Wang, T., Qian, X., He, F., Hu, X., Cao, Y., & Ramani, K. (Oct. 10, 2021). GesturAR: An authoring system for creating freehand interactive augmented reality applications. Retrieved from https://dl.acm.org/doi/pdf/10.1145/3472749.3474769. (Year: 2021).*
Tushar Nagarajan, Christoph Feichtenhofer, and Kristen Grauman. 2019. Grounded human-object interaction hotspots from video. In Proceedings of the IEEE/CVF International Conference on Computer Vision. 8688-8697.
Tushar Nagarajan, Yanghao Li, Christoph Feichtenhofer, and Kristen Grauman. 2020. Ego-topo: Environment affordances from egocentric video. In Proceedings of the IEEE/CVF Conference on Computer Vision and Pattern Recognition. 163-172.
Kiran Nasim and Young J Kim. 2018. Physics-based assistive grasping for robust object manipulation in virtual reality. Computer Animation and Virtual Worlds 29, 3-4 (2018), e1820.
Oculus Quest 2 2022. Oculus Quest 2: Our Most Advanced New All-in-One VR Headset | Oculus. https://www.oculus.com/quest-2.
Paschalis Panteleris, Iason Oikonomidis, and Antonis Argyros. 2018. Using a single rgb frame for real time 3d hand pose estimation in the wild. In 2018 IEEE Winter Conference on Applications of Computer Vision (Wacv). IEEE, 436-445.
Joseph Redmon, Santosh Divvala, Ross Girshick, and Ali Farhadi. 2016. You only look once: Unified, real-time object detection. In Proceedings of the IEEE conference on computer vision and pattern recognition. 779-788.
Richard Sennett. 2008. The craftsman. Yale University Press.
Tomas Simon, Hanbyul Joo, Iain Matthews, and Yaser Sheikh. 2017. Hand keypoint detection in single images using multiview bootstrapping. In Proceedings of the IEEE conference on Computer Vision and Pattern Recognition. 1145-1153.
Shuran Song, Samuel P Lichtenberg, and Jianxiong Xiao. 2015. Sun rgb-d: A rgb-d scene understanding benchmark suite. In Proceedings of the IEEE conference on computer vision and pattern recognition. 567-576.
Stereolabs. 2022. ZED Mini Stereo Camera—Stereolabs. Retrieved Mar. 1, 2022 from https://www.stereolabs.com/zed-mini/.
Jonti Talukdar, Sanchit Gupta, PS Rajpura, and Ravi S Hegde. 2018. Transfer learning for object detection using state-of-the-art deep neural networks. In 2018 5th International Conference on Signal Processing and Integrated Networks (SPIN). IEEE, 78-83.
Manuel Veit, Antonio Capobianco, and Dominique Bechmann. 2009. Influence of degrees of freedom's manipulation on performances during orientation tasks in virtual reality environments. In Proceedings of the 16th ACM Symposium on Virtual Reality Software and Technology. 51-58.
Luis Von Ahn and Laura Dabbish. 2004. Labeling images with a computer game. In Proceedings of the SIGCHI conference on Human factors in computing systems. 319-326.
Luis Von Ahn and Laura Dabbish. 2008. Designing games with a purpose. Commun. ACM 51, 8 (2008), 58-67.
Fan Wang and Kris Hauser. 2019. In-hand object scanning via rgb-d video segmentation. In 2019 International Conference on Robotics and Automation (ICRA). IEEE, 3296-3302.
Tianyi Wang, Xun Qian, Fengming He, Xiyun Hu, Yuanzhi Cao, and Karthik Ramani. 2021. GesturAR: An Authoring System for Creating Freehand Interactive Augmented Reality Applications. In The 34th Annual ACM Symposium on User Interface Software and Technology. 552-567.
Tianyi Wang, Xun Qian, Fengming He, Xiyun Hu, Ke Huo, Yuanzhi Cao, and Karthik Ramani. 2020. CAPturAR: An augmented reality tool for authoring human-involved context-aware applications. In Proceedings of the 33rd Annual ACM Symposium on User Interface Software and Technology. 328-341.
Tianyi Wang, Xun Qian, Fengming He, and Karthik Ramani. 2021. LightPaintAR: Assist Light Painting Photography with Augmented Reality. In Extended Abstracts of the 2021 CHI Conference on Human Factors in Computing Systems. 1-6.
Yeping Wang, Gopika Ajaykumar, and Chien-Ming Huang. 2020. See what i see: Enabling user-centric robotic assistance using first-person demonstrations. In Proceedings of the 2020 ACM/IEEE International Conference on Human-Robot Interaction. 639-648.
Curtis Wilkes and Doug A Bowman. 2008. Advantages of velocity-based scaling for distant 3D manipulation. In Proceedings of the 2008 ACM symposium on Virtual reality software and technology. 23-29.
Yu Xiang, Tanner Schmidt, Venkatraman Narayanan, and Dieter Fox. 2017. Posecnn: A convolutional neural network for 6d object pose estimation in cluttered scenes. arXiv preprint arXiv:1711.00199 (2017).
Yi Yang and Deva Ramanan. 2012. Articulated human detection with flexible mixtures of parts. IEEE transactions on pattern analysis and machine intelligence 35, 12 (2012), 2878-2890.
Yang Zhang, Yasha Iravantchi, Haojian Jin, Swarun Kumar, and Chris Harrison. 2019. Sozu: Self-powered radio tags for building-scale activity sensing. In Proceedings of the 32nd Annual ACM Symposium on User Interface Software and Technology. 973-985.
Yang Zhang, Gierad Laput, and Chris Harrison. 2017. Electrick: Low-cost touch sensing using electric field tomography. In Proceedings of the 2017 CHI Conference on Human Factors in Computing Systems. 1-14.
Qian Zhou, Sarah Sykes, Sidney Fels, and Kenrick Kin. 2020. Gripmarks: Using Hand Grips to Transform In-Hand Objects into Mixed Reality Input. In Proceedings of the 2020 CHI Conference on Human Factors in Computing Systems. 1-11.
Christian Zimmermann and Thomas Brox. 2017. Learning to estimate 3d hand pose from single rgb images. In Proceedings of the IEEE international conference on computer vision. 4903-4911.
Christian Zimmermann, Duygu Ceylan, Jimei Yang, Bryan Russell, Max Argus, and Thomas Brox. 2019. Freihand: A dataset for markerless capture of hand pose and shape from single rgb images. In Proceedings of the IEEE/CVF International Conference on Computer Vision. 813-822.
Adel Ahmadyan, Liangkai Zhang, Artsiom Ablavatski, Jianing Wei, and Matthias Grundmann. 2021. Objectron: A large scale dataset of object-centric videos in the wild with pose annotations. In Proceedings of the IEEE/CVF Conference on Computer Vision and Pattern Recognition. 7822-7831.
Hugo Alvarez, Iker Aguinaga, and Diego Borro. 2011. Providing guidance for maintenance operations using automatic markerless augmented reality system. In 2011 10th IEEE International Symposium on Mixed and Augmented Reality. IEEE, 181-190.
Dafni Antotsiou, Guillermo Garcia-Hernando, and Tae-Kyun Kim. 2018. Task oriented hand motion retargeting for dexterous manipulation imitation. In Proceedings of the European Conference on Computer Vision (ECCV) Workshops. 0-0.

(56) References Cited

OTHER PUBLICATIONS

Rahul Arora, Rubaiat Habib Kazi, Tovi Grossman, George Fitzmaurice, and Karan Singh. 2018. Symbiosissketch: Combining 2d & 3d sketching for designing detailed 3d objects in situ. In Proceedings of the 2018 CHI Conference on Human Factors in Computing Systems. 1-15.

Samarth Brahmbhatt, Chengcheng Tang, Christopher D Twigg, Charles C Kemp, and James Hays. 2020. ContactPose: A dataset of grasps with object contact and hand pose. In European Conference on Computer Vision. Springer, 361-378.

Holger Caesar, Jasper Uijlings, and Vittorio Ferrari. 2018. Cocostuff: Thing and stuff classes in context. In Proceedings of the IEEE conference on computer vision and pattern recognition. 1209-1218.

Yuanzhi Cao, Xun Qian, Tianyi Wang, Rachel Lee, Ke Huo, and Karthik Ramani. 2020. An exploratory study of augmented reality presence for tutoring machine tasks. In Proceedings of the 2020 CHI conference on human factors in computing systems. 1-13.

Yuanzhi Cao, Tianyi Wang, Xun Qian, Pawan S Rao, Manav Wadhawan, Ke Huo, and Karthik Ramani. 2019. GhostAR: A time-space editor for embodied authoring of human-robot collaborative task with augmented reality. In Proceedings of the 32nd Annual ACM Symposium on User Interface Software and Technology. 521-534.

Zhe Cao, Tomas Simon, Shih-En Wei, and Yaser Sheikh. 2017. Realtime multiperson 2d pose estimation using part affinity fields. In Proceedings of the IEEE conference on computer vision and pattern recognition. 7291-7299.

Fu Chang, Chun-Jen Chen, and Chi-Jen Lu. 2004. A linear-time componentlabeling algorithm using contour tracing technique. computer vision and image understanding 93, 2 (2004), 206-220.

Joseph Chee Chang, Saleema Amershi, and Ece Kamar. 2017. Revolt: Collaborative crowdsourcing for labeling machine learning datasets. In Proceedings of the 2017 CHI Conference on Human Factors in Computing Systems. 2334-2346.

Yun Suk Chang, Benjamin Nuernberger, Bo Luan, and Tobias Höllerer. 2017. Evaluating gesture-based augmented reality annotation. In 2017 IEEE Symposium on 3D User Interfaces (3DUI). IEEE, 182-185.

Subramanian Chidambaram, Hank Huang, Fengming He, Xun Qian, Ana M Villanueva, Thomas S Redick, Wolfgang Stuerzlinger, and Karthik Ramani. 2021. Processar: An augmented reality-based tool to create in-situ procedural 2d/3d ar instructions. In Designing Interactive Systems Conference 2021. 234-249.

Michael P Domjan. 2014. The principles of learning and behavior. Cengage Learning.

Scott Frees, G Drew Kessler, and Edwin Kay. 2007. PRISM interaction for enhancing control in immersive virtual environments. ACM Transactions on ComputerHuman Interaction (TOCHI) 14, 1 (2007), 2-es.

Markus Funk, Andreas Bächler, Liane Bächler, Thomas Kosch, Thomas Heidenreich, and Albrecht Schmidt. 2017. Working with augmented reality? A long-term analysis of in-situ instructions at the assembly workplace. In Proceedings of the 10th international conference on pervasive technologies related to assistive environments. 222-229.

Lei Gao, Huidong Bai, Gun Lee, and Mark Billinghurst. 2016. An oriented pointcloud view for MR remote collaboration. In Siggraph Asia 2016 Mobile Graphics and Interactive Applications. 1-4.

Guillermo Garcia-Hernando, Shanxin Yuan, Seungryul Baek, and Tae-Kyun Kim. 2018. First-person hand action benchmark with rgb-d videos and 3d hand pose annotations. In Proceedings of the IEEE conference on computer vision and pattern recognition. 409-419.

Danilo Gasques, Janet G Johnson, Tommy Sharkey, and Nadir Weibel. 2019. What you sketch is what you get: Quick and easy augmented reality prototyping with pintar. In Extended Abstracts of the 2019 CHI Conference on Human Factors in Computing Systems. 1-6.

Georgios Georgakis, Arsalan Mousavian, Alexander C Berg, and Jana Kosecka. 2017. Synthesizing training data for object detection in indoor scenes. arXiv preprint arXiv:1702.07836 (2017).

Duncan Goudie and Aphrodite Galata. 2017. 3D hand-object pose estimation from depth with convolutional neural networks. In 2017 12th IEEE International Conference on Automatic Face & Gesture Recognition (FG 2017). IEEE, 406-413.

Anhong Guo, Xiang'Anthony' Chen, Haoran Qi, Samuel White, Suman Ghosh, Chieko Asakawa, and Jeffrey P Bigham. 2016. Vizlens: A robust and interactive screen reader for interfaces in the real world. In Proceedings of the 29th annual symposium on user interface software and technology. 651-664.

Shreyas Hampali, Mahdi Rad, Markus Oberweger, and Vincent Lepetit. 2020. Honnotate: A method for 3d annotation of hand and object poses. In Proceedings of the IEEE/CVF conference on computer vision and pattern recognition. 3196-3206.

Ping-Hsuan Han, Kuan-Wen Chen, Chen-Hsin Hsieh, Yu-Jie Huang, and Yi-Ping Hung. 2016. Ar-arm: Augmented visualization for guiding arm movement in the first-person perspective. In Proceedings of the 7th Augmented Human International Conference 2016. 1-4.

Ping-Hsuan Han, Jia-Wei Lin, Chen-Hsin Hsieh, Jhih-Hong Hsu, and Yi-Ping Hung. 2018. tARget: limbs movement guidance for learning physical activities with a video see-through head-mounted display. In ACM SIGGRAPH 2018 Posters. 1-2.

Yana Hasson, Gul Varol, Dimitrios Tzionas, Igor Kalevatykh, Michael J Black, Ivan Laptev, and Cordelia Schmid. 2019. Learning joint reconstruction of hands and manipulated objects. In Proceedings of the IEEE/CVF conference on computer vision and pattern recognition. 11807-11816.

Juan David Hincapié-Ramos, Xiang Guo, Paymahn Moghadasian, and Pourang Irani. 2014. Consumed endurance: a metric to quantify arm fatigue of mid-air interactions. In Proceedings of the SIGCHI Conference on Human Factors in Computing Systems. 1063-1072.

Thuong N Hoang, Martin Reinoso, Frank Vetere, and Egemen Tanin. 2016. Onebody: remote posture guidance system using first person view in virtual environment. In Proceedings of the 9th Nordic Conference on Human-Computer Interaction. 1-10.

Markus Höll, Markus Oberweger, Clemens Arth, and Vincent Lepetit. 2018. Efficient physics-based implementation for realistic hand-object interaction in virtual reality. In 2018 IEEE Conference on Virtual Reality and 3D User Interfaces (VR). IEEE, 175-182.

Gaoping Huang, Xun Qian, Tianyi Wang, Fagun Patel, Maitreya Sreeram, Yuanzhi Cao, Karthik Ramani, and Alexander J Quinn. 2021. Adaptutar: An adaptive tutoring system for machine tasks in augmented reality. In Proceedings of the 2021 CHI Conference on Human Factors in Computing Systems. 1-15.

Ke Huo and Karthik Ramani. 2017. Window-shaping: 3d design ideation by creating on, borrowing from, and looking at the physical world. In Proceedings of the Eleventh International Conference on Tangible, Embedded, and Embodied Interaction. 37-45.

Shahram Izadi, David Kim, Otmar Hilliges, David Molyneaux, Richard Newcombe, Pushmeet Kohli, Jamie Shotton, Steve Hodges, Dustin Freeman, Andrew Davison, et al. 2011. Kinectfusion: realtime 3d reconstruction and interaction using a moving depth camera. In Proceedings of the 24th annual ACM symposium on User interface software and technology. 559-568.

Sujin Jang, Wolfgang Stuerzlinger, Satyajit Ambike, and Karthik Ramani. 2017. Modeling cumulative arm fatigue in mid-air interaction based on perceived exertion and kinetics of arm motion. In Proceedings of the 2017 CHI Conference on Human Factors in Computing Systems. 3328-3339.

Hanbyul Joo, Hao Liu, Lei Tan, Lin Gui, Bart Nabbe, Iain Matthews, Takeo Kanade, Shohei Nobuhara, and Yaser Sheikh. 2015. Panoptic studio: A massively multiview system for social motion capture. In Proceedings of the IEEE International Conference on Computer Vision. 3334-3342.

Thomas Kosch and Albrecht Schmidt. 2020. Enabling Tangible Interaction through Detection and Augmentation of Everyday Objects. arXiv preprint arXiv:2012.10904 (2020).

Max Krichenbauer, Goshiro Yamamoto, Takafumi Taketom, Christian Sandor, and Hirokazu Kato. 2017. Augmented reality versus

(56) References Cited

OTHER PUBLICATIONS virtual reality for 3d object manipulation. IEEE transactions on visualization and computer graphics 24, 2 (2017), 1038-1048.

Kin Chung Kwan and Hongbo Fu. 2019. Mobi3dsketch: 3D sketching in mobile AR. In Proceedings of the 2019 CHI Conference on Human Factors in Computing Systems. 1-11.

Taein Kwon, Bugra Tekin, Jan Stühmer, Federica Bogo, and Marc Pollefeys. 2021. H2o: Two hands manipulating objects for first person interaction recognition. In Proceedings of the IEEE/CVF International Conference on Computer Vision. 10138-10148.

Michael Laielli, James Smith, Giscard Biamby, Trevor Darrell, and Bjoern Hartmann. 2019. Labelar: a spatial guidance interface for fast computer vision image collection. In Proceedings of the 32nd annual ACM symposium on user interface software and technology. 987-998.

Gierad Laput, Chouchang Yang, Robert Xiao, Alanson Sample, and Chris Harrison. 2015. Em-sense: Touch recognition of uninstrumented, electrical and electromechanical objects. In Proceedings of the 28th Annual ACM Symposium on User Interface Software & Technology. 157-166.

Jangwon Lee and Michael S Ryoo. 2017. Learning robot activities from first person human videos using convolutional future regression. In Proceedings of the IEEE Conference on Computer Vision and Pattern Recognition Workshops. 1-2.

Kyungjun Lee and Hernisa Kacorri. 2019. Hands holding clues for object recognition in teachable machines. In Proceedings of the 2019 CHI Conference on Human Factors in Computing Systems. 1-12.

Hanchuan Li, Can Ye, and Alanson P Sample. 2015. IDSense: A human object interaction detection system based on passive UHF RFID. In Proceedings of the 33rd Annual ACM Conference on Human Factors in Computing Systems. 2555-2564.

Kailin Li, Lixin Yang, Xinyu Zhan, Jun Lv, Wenqiang Xu, Jiefeng Li, and Cewu Lu. 2021. ArtiBoost: Boosting Articulated 3D Hand-Object Pose Estimation via Online Exploration and Synthesis. arXiv preprint arXiv:2109.05488 (2021).

Yunzhi Lin, Jonathan Tremblay, Stephen Tyree, Patricio A Vela, and Stan Birchfield. 2021. Single-stage Keypoint-based Category-level Object Pose Estimation from an RGB Image. arXiv preprint arXiv:2109.06161 (2021).

Yao Lu and Walterio W Mayol-Cuevas. 2021. The Object at Hand: Automated Editing for Mixed Reality Video Guidance from Hand-Object Interactions. In 2021 IEEE International Symposium on Mixed and Augmented Reality (ISMAR). IEEE, 90-98.

Anthony Martinet, Géry Casiez, and Laurent Grisoni. 2010. The effect of dof separation in 3d manipulation tasks with multi-touch displays. In Proceedings of the 17th acm symposium on virtual reality software and technology. 111-118.

Daniel Mendes, Filipe Relvas, Alfredo Ferreira, and Joaquim Jorge. 2016. The benefits of dof separation in mid-air 3d object manipulation. In Proceedings of the 22nd ACM conference on virtual reality software and technology. 261-268.

Microsoft HoloLens 2022. Microsoft HoloLens | Mixed Reality Technology for Business. https://www.microsoft.com/en-us/hololens.

Gyeongsik Moon, Shoou-I Yu, He Wen, Takaaki Shiratori, and Kyoung Mu Lee. 2020. Interhand2.6m: A dataset and baseline for 3d interacting hand pose estimation from a single rgb image. In European Conference on Computer Vision. Springer, 548-564.

\* cited by examiner

Algorithm 1 Preprocess an *Interaction Clip*

1: procedure PREPROCESSINTERACTIONCLIP($[b_1, b_2, \cdots, b_N]$)
2:     for $i \leftarrow 2, N$ do
3:         if $b_i.\text{acce} > \text{acce}_{max}$ then
4:             ▷ Extend the time duration of the current batch
5:             $t_{end} \leftarrow \frac{b_i.\text{acce}(f_{ik}.t - f_{i1}.t)}{\text{sign}(b_i.\text{acce})\text{acce}_{max}}$
6:             $\Delta t \leftarrow t_{end} - f_{ik}.t$
7:             if $\Delta t > \Delta t_{max}$ then
8:                 $\Delta t \leftarrow \Delta t_{max}$
9:             end if
10:            for $j \leftarrow 2, k$ do
11:                 $f_{ik}.t \leftarrow f_{i1}.t + (j-1)\frac{\Delta t}{k-1}$
12:            end for
13:            ▷ Postpone the timestamps of all the later frames
14:            for $m \leftarrow i + 1, N$ do
15:               for $j \leftarrow 1, k$ do
16:                 $f_{mj}.t \leftarrow f_{mj}.t + \Delta t$
17:               end for
18:            end for
19:        end if
20:     end for
21: end procedure

FIG. 11

Algorithm 2 Image and Hand Label Matching

1: procedure GETNEWLABELARRAY($[f_1, f_2, ..., f_N]$)
2:     $Labels \leftarrow array[\,]$
3:     for $i \leftarrow 1 + \frac{m}{2}, N - \frac{m}{2}$ do
4:         $maxIdx \leftarrow i$
5:         if $Num_{ii} < 21$ then
6:             for $j \leftarrow i - \frac{m}{2}, i + \frac{m}{2}$ do
7:                 if $Num_{i,j} > Num_{i,maxIdx}$ then
8:                     $maxIdx \leftarrow j$
9:                 end if
10:                 if $Num_{i,j} = Num_{i,maxIdx}$ and $|f_i.t - f_j.t| < |f_i.t - f_{maxIdx}.t|$ then
11:                     $maxIdx \leftarrow j$
12:                 end if
13:             end for
14:         end if
15:         add $f_{maxIdx}.h$ to $Labels$
16:     end for
17:     for $i \leftarrow 1 + \frac{m}{2}, N - \frac{m}{2}$ do
18:         $f_i.h \leftarrow Labels[i]$
19:     end for
20: end procedure

FIG. 15

AUGMENTED REALITY SYSTEM AND METHOD FOR COLLECTING CUSTOM DATASETS FOR 3D HAND-OBJECT INTERACTION POSE ESTIMATION

This application claims the benefit of priority of U.S. provisional application Ser. No. 63/378,137, filed on Oct. 3, 2022 the disclosure of which is herein incorporated by reference in its entirety.

GOVERNMENT LICENSE RIGHTS

This invention was made with government support under contract number DUE1839971 awarded by the National Science Foundation. The government has certain rights in the invention.

FIELD

The device and method disclosed in this document relates to augmented reality and, more particularly, to collecting custom datasets for 3D hand-object interaction pose estimation.

BACKGROUND

Unless otherwise indicated herein, the materials described in this section are not admitted to be the prior art by inclusion in this section.

Humans use hands to interact with physical objects and tools in everyday life and work. With the advents of hardware devices and computational algorithms, Human-Computer Interaction (HCI) researchers have exploited the information behind the hand-object interaction in practical applications such as daily interaction activities monitoring, interaction-triggered context-aware applications, engineering task tutoring, and tangible mixed reality (MR) interfaces. Among this research, researchers are exploring vision-based 3D object and hand pose estimation neural networks as an interaction perception technique, owing to the high reliability and scalability.

The training dataset for a deep learning model plays an important role in model performance. For 3D object and hand pose estimation, while multiple bench-marking datasets have been published, existing datasets cannot sufficiently cover the diversified real-world scenarios. An object pose estimation network easily fails when a user interacts with an object that is visually distinct from its training data counterparts (e.g., a plain-color 'cup' in a bench-marking dataset versus the user's 'cup' in a different shape and with decorations). Moreover, a pre-trained network has limited performance when a specific application context is not considered during training. For example, a hand pose estimation network trained using a daily-object dataset may malfunction in industrial scenarios (e.g., machine repair and assembly tasks) because the objects involved, their background scenes, and the manner of object manipulation can be significantly different. In light of this, what is needed is a system that supports users in the collection of object-specified and task-specified datasets so that the trained object and hand pose estimation networks can achieve satisfactory performance in the target real-world applications.

Moreover, following ideas from 2D labeling tools, some prior works have allowed users to first capture images, then label the 3D poses of the involved objects using a post-hoc 2D user interface. However, these processes become infeasible when the 3D hand poses are taken into consideration. The inevitable hand-object occlusions hamper users from labeling the hand joints hidden behind the object on an image. Further, the cognitive load for the annotators and the number of operations to convert the 3D-domain hand-object interaction as the labels on a 2D image are high. Typically, an annotator has to first understand the 3D spatial relationship between a hand skeleton and an object, then manipulate the 3D label to a proper position using the projected 2D labels as visual feedback. In addition, it is tedious to mark over thousands of images where each image contains more than 20 hand joints. In other works, researchers have placed multiple cameras and sensors in laboratory environments to obtain the 3D poses of either hands or objects, while other works adopt optimization algorithms to synthesize or estimate the 3D poses as labels. Compared with the post-hoc interface ideas, these works not only solve the occlusion issue, but can also generate both the images and labels concurrently through continuous recordings, which significantly improve the efficiency. However, these multi-camera techniques require additional hardware setups. Additionally, the synthesis and estimation techniques often limit the target objects to only those objects included in other benchmarking datasets. Consequently, it is impractical for ordinary users to utilize these systems ad-hoc dataset collection. Thus, it would be highly advantageous to provide a system that enables an efficient and scalable dataset collection approach while addressing the hand-object occlusion problem.

SUMMARY

A method for collecting a hand-object interaction dataset is disclosed. The method comprises generating, with a processor, based on user inputs, a virtual bounding box for a physical object that is to be interacted with. The method further comprises displaying, on a display, an augmented reality (AR) graphical user interface including the virtual bounding box superimposed on a real-world environment. The method further comprises generating a time series of hand pose labels and a time series of object pose labels by capturing, with at least one camera, a first time series of images of manipulations of the virtual bounding box in which a user virtually grabs the virtual bounding box with their hand and manipulates the virtual bounding by moving their hand. The method further comprises capturing, with the at least one camera, a second time series of images of manipulations of the physical object in which the user physically grabs the physical object and mimics the previously performed manipulations of the virtual bounding box. The method further comprises generating, with the processor, the hand-object interaction dataset by pairing the time series of hand pose labels and time series of the object pose labels with the second time series of images.

BRIEF DESCRIPTION OF THE DRAWINGS

The foregoing aspects and other features of the system and methods are explained in the following description, taken in connection with the accompanying drawings.

FIG. 11 shows pseudocode for an algorithm for temporally smoothing an interaction clip by clamping the linear and angular accelerations of the bounding contour.

FIG. 15 shows pseudocode for an algorithm for matching an image with hand pose labels of a nearby pose frame.

DETAILED DESCRIPTION

Figure 1:
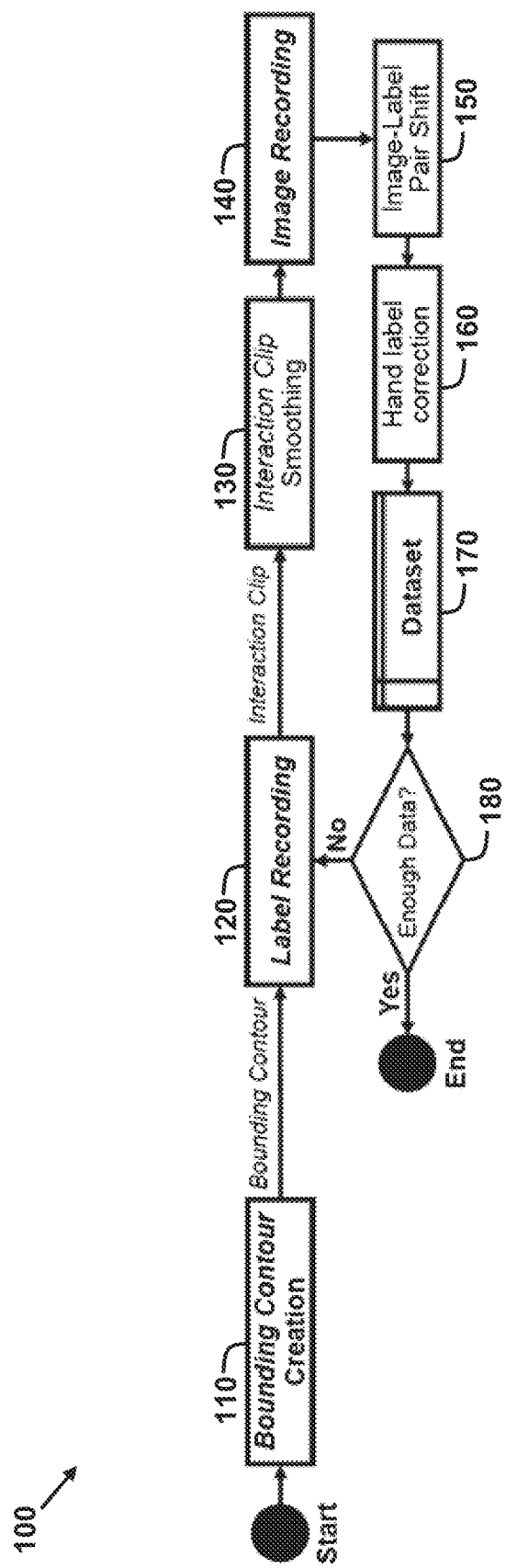
FIG. 1 shows a flow diagram for an overall method of collecting a hand-object interaction dataset for 3D object pose estimation.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Overview

Figure 2A:
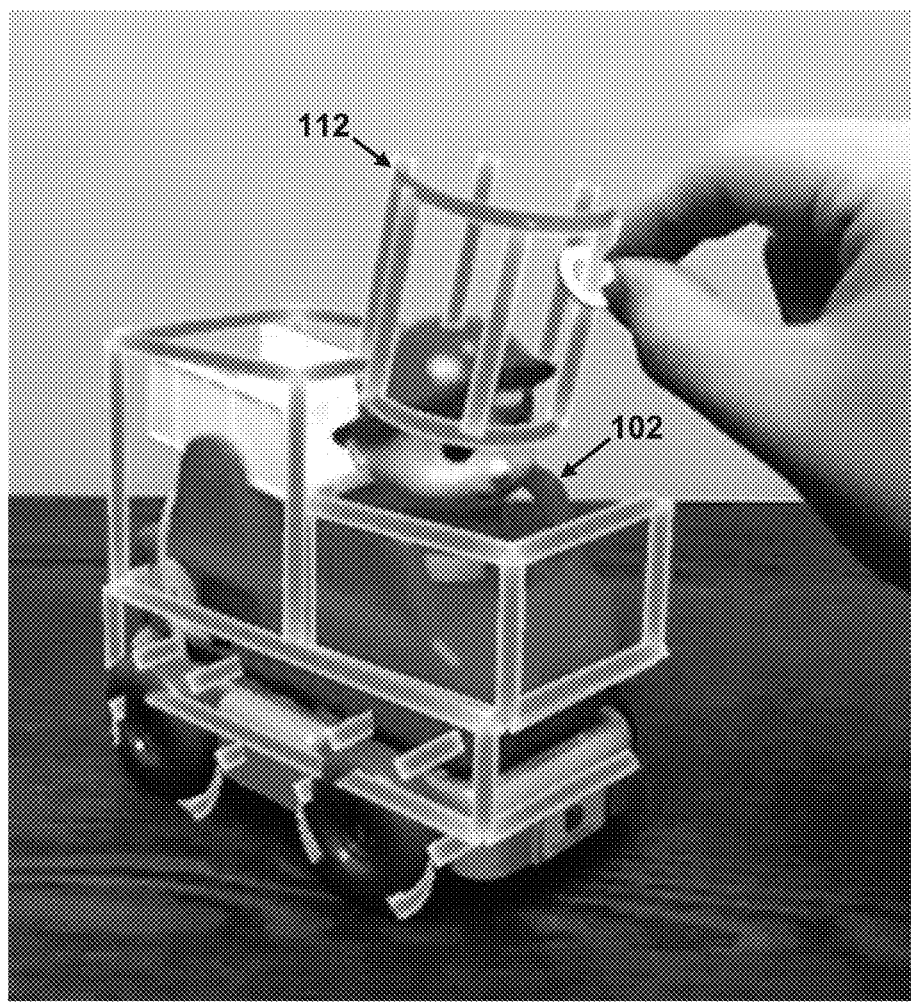
FIGS. 2A-2D summarize the collection of a hand-object interaction dataset for interacting with a toy car.
Figure 2B:
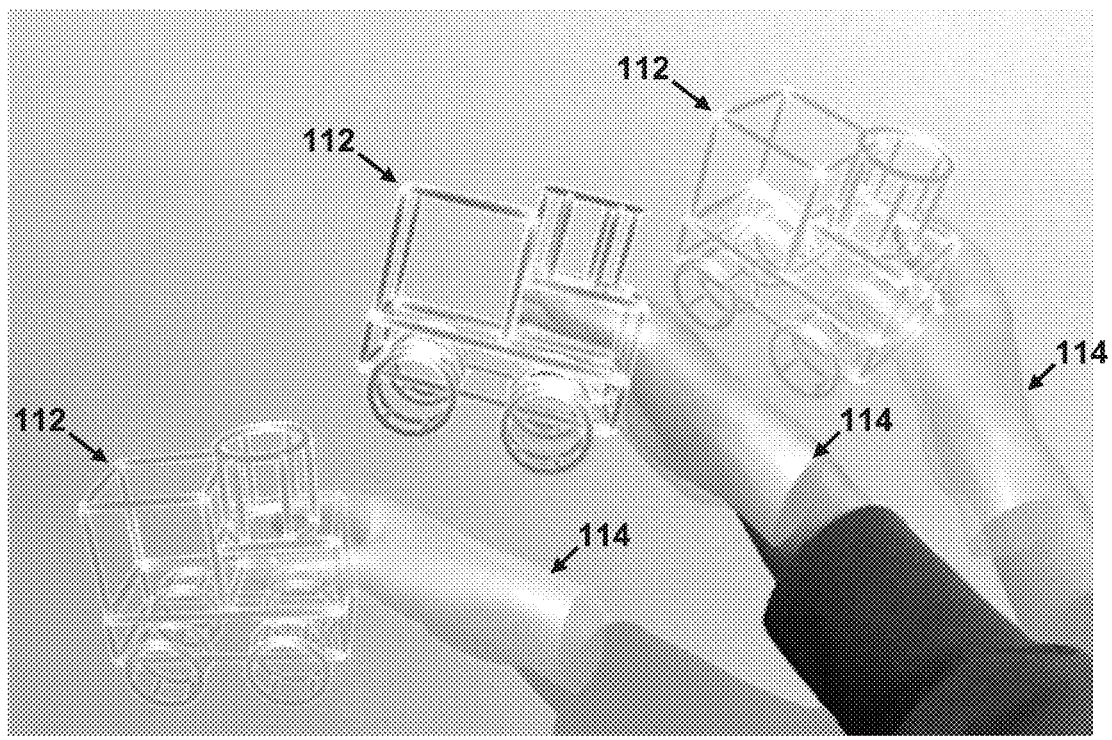
Figure 2C:
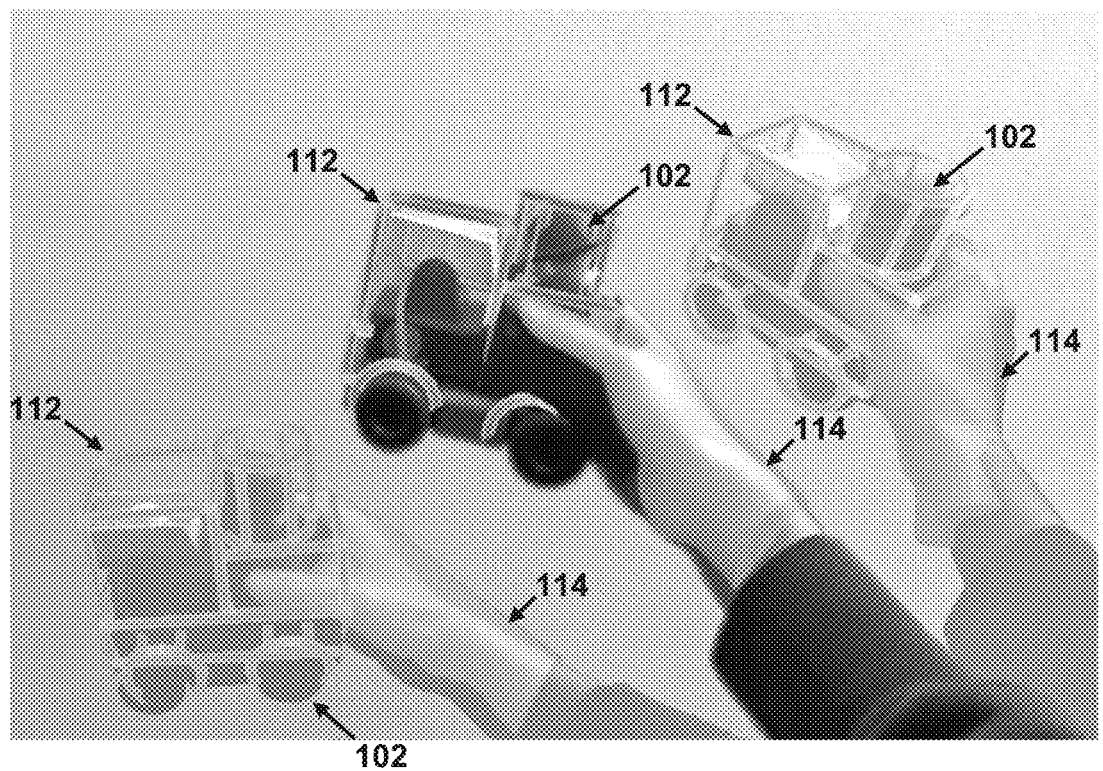
Figure 2D:
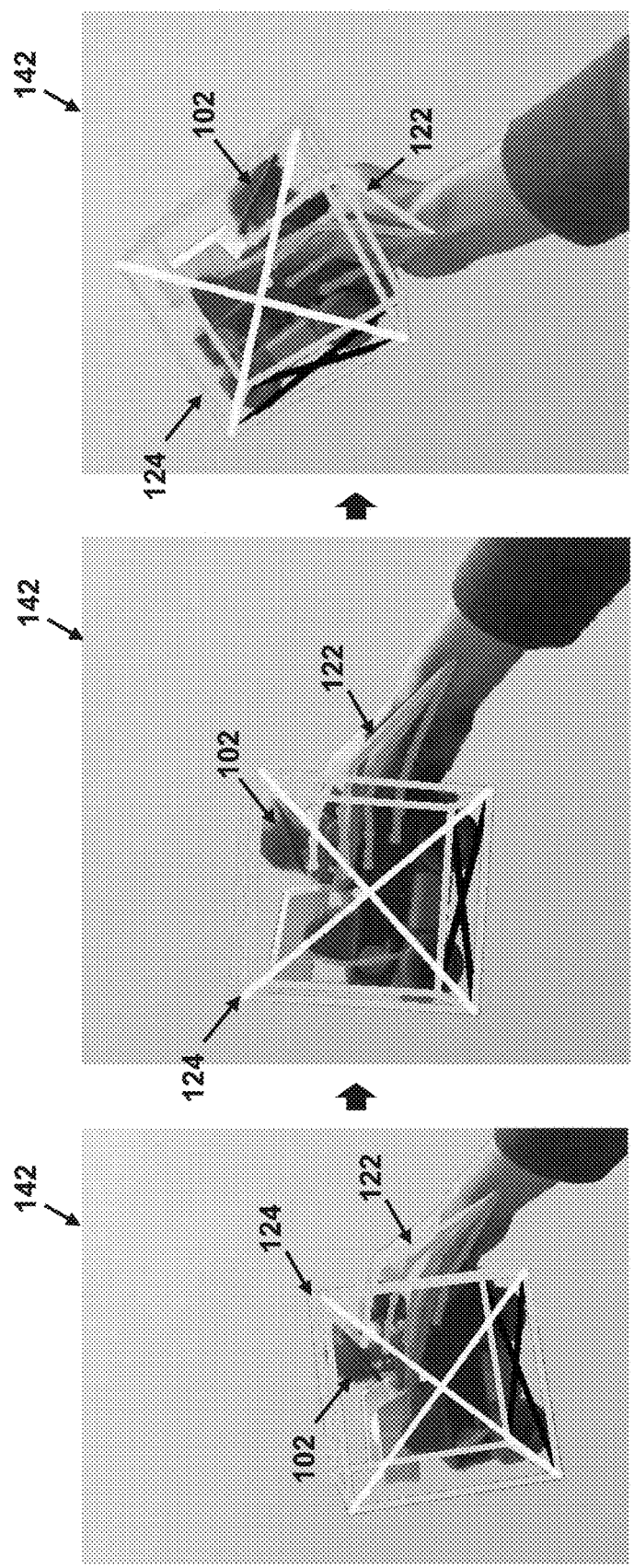
Figure 3:
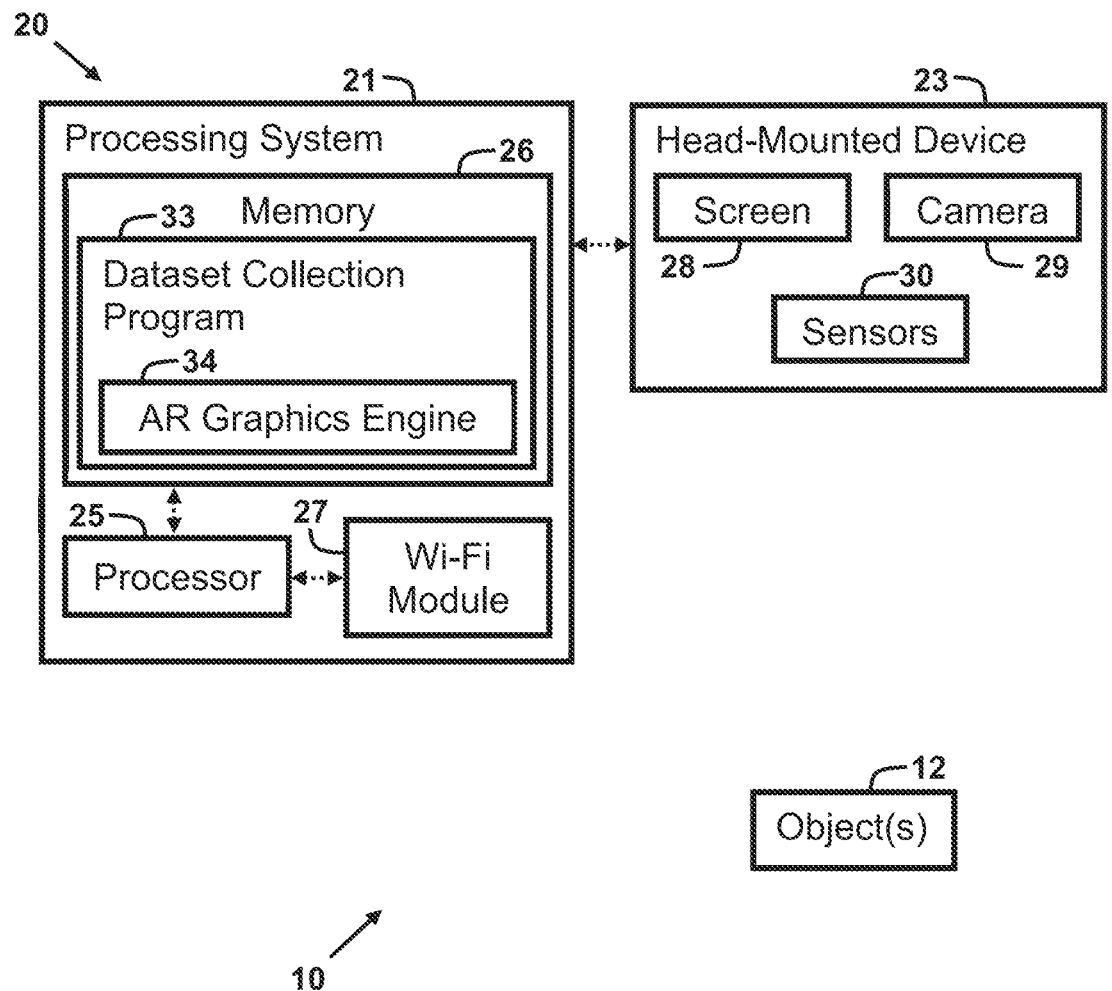
FIG. 3 shows exemplary hardware components of the dataset collection system.

With reference to FIGS. 1-3, exemplary embodiments of a hand-object interaction dataset collection system 10 are described. The dataset collection system 10, shown in FIG. 3, is configured to support user-specified collection of hand-object interaction datasets. Such hand-object interaction datasets are useful, for example, for training 3D hand and object pose estimation model. In one example, a CenterPose network could be trained for 3D object pose detection using the hand-object interaction datasets and an OpenPose model could be trained for 3D hand pose estimation using the hand-object interaction datasets. The dataset collection system 10 utilizes a sequential workflow for pervasive and continuous collection of hand-object interaction datasets, which addresses the hand-occlusion issue by separating the processes of collecting images and hand-object pose labels for the dataset. Additionally, the dataset collection system 10 provides both front-end visual assistance and back-end computational processes that support users in creating a hand-object interaction dataset with high label accuracy.

The dataset collection system 10 advantageously leverages augmented reality (AR) technology to address many of the challenges and concerns with conventional processes. Particularly, the spatial awareness of AR allows for pervasive perception of the 3D poses of virtual elements during the dataset collection process. With this spatial awareness, static and dynamic virtual contents can be fixed in mid-air as spatial references. The user can record their hand and body movements as in-situ AR animations and then precisely follow them to complete various tasks. An AR head-mounted device (AR-HMD) 23 of the system 10, shown in FIG. 3, has embedded hand-tracking functionality that provides accurate 3D hand skeleton detection when no occlusion occurs. With embedded hand-tracking, together with image capture functionality, the AR-HMD 23 advantageously enables the user to continuously collect 3D object and hand labels, with corresponding images in any target environment.

FIG. 1 shows a flow diagram for an overall method 100 of collecting a hand-object interaction dataset for 3D object pose estimation. As noted above, instead of collecting the images and labels of a dataset concurrently or in a post-hoc labeling manner, the method 100 adopts a sequential process of first creating the digital hand and object pose labels, then capturing the images of the physical-domain hand-object interaction. The two parts are temporally paired when users spatially align the object and hand with an animation of the labels in AR.

The method 100 begins with a bounding contour creation process (block 110) in which the dataset collection system 10 generates, based on user inputs, a virtual bounding box for a physical object that is to be interacted with. Particularly, a user creates a virtual 3D bounding box and/or bounding contours that virtually represents a target physical object. As used herein, the phrase "bounding box" should not be understood to require a simple cuboid or rectangular bounding box. Instead, the virtual bounding box is any bounding volume defined by bounding contours of any form or shape. In this way, the phrases "bounding box" and "bounding contours" should be understood to be interchangeable.

FIG. 2A shows an exemplary bounding contour creation process in which the user creates bounding contours 112 that define a virtual bounding box for a toy car 102. The user creates the bounding contours 112 having the same geometric features of the physical toy car by spatially aligning multiple virtual primitives with proper sizes with the corresponding elements of the toy car 102. By leveraging AR, the user can spatially refer to the real-world toy car 102 while defining the bounding contours 112.

Next, the user starts to collect the dataset. The method 100 separates the dataset collection into two sequential steps: label recording and image recording. First, the method 100 continues with a label recording process (block 120) in which the dataset collection system 10 generates a time series of hand pose labels and a time series of object pose labels, referred to herein as an "interaction clip." Particularly, the AR-HMD 23 displays an AR graphical user interface that includes the virtual bounding box superimposed on the environment. With this spatial reference, the user virtually grabs the virtual bounding box with their hand and manipulates the virtual bounding by moving their hand. The user grabs the virtual bounding box in AR in an equivalent manner to how the user would hold the physical object.

During this manipulation of the virtual bounding box, the dataset collection system 10 captures a time series of images of the manipulation and, based on the images, tracks the 3D poses of the user's hand and of the bounding box and generates the time series of hand pose labels and the time series of object pose labels for the hand-object interaction dataset. Naturally, hand-object occlusions do not occur during the manipulation of the virtual bounding box, so these labels are provided with high accuracy. In some embodiments, the method 100 incorporates an interaction clip smoothing process (block 130) in which the dataset collection system 10 smooths the time series data of the interaction clip.

FIG. 2B shows an exemplary label recording process in which the user grabs the bounding contours 112 in the same way as grabbing the toy car 102, and manipulates the bounding contours 112. With the spatial awareness and the hand-tracking capability of the AR-HMD 23, the dataset collection system 10 records the 3D positions and orientations of the bounding contours 112 together with the 3D positions and orientations of the hand joints and saves them as an interaction clip. In some embodiments, a hand mesh model 114 is displayed that illustrates a grabbing pose for the user's hand, which provides a visual reference to the user that helps the user maintain a consistent grabbing pose during the manipulation of the bounding contours 112.

After the label recording process, the method 100 continues with an image recording process (block 140) in which the dataset collection system 10 captures a time series of images of manipulations of the physical object. Particularly, within the AR graphical user interface, the AR-HMD 23 displays an animation of the previously performed manipulations of the virtual bounding box as a spatial reference for the user. During the animation, the user physically grabs the physical object and mimics the previously performed manipulations of the virtual bounding box by precisely aligning both their hand and physical object with the animation displayed in AR. During the synchronized manipulation of the physical object, the dataset collection system 10 captures the time series of images for hand-object interaction dataset.

FIG. 2C shows an exemplary image recording process in which the user grabs the toy car 102 and mimics the previously performed manipulations of the bounding contours 112. The animation displayed in AR includes the bounding contours 112 animated to move according to the previously performed manipulations of the bounding contours 112. Additionally, the animation includes a hand mesh model 114 that illustrates a grabbing pose for the user's hand. The user moves the physical car and ensures the toy car 102 is accurately aligned with the animated bounding contour throughout the entire interaction clip with the help of visual reference enabled by the AR-HMD 23.

Finally, the method 100 continues with a dataset formation process (block 170) in which the dataset collection system 10 generates the hand-object interaction dataset. Particularly, the time series of hand pose labels and time series of the object pose labels generated in the label recording process are paired with the time series of images captured in the image recording process to provide the image-label pairs of the hand-object interaction dataset. In some embodiments, prior to the dataset formation process, the method 100 incorporates an image-label pair shift process (block 150) in which the dataset collection system 10 shifts timestamps of the time series of hand pose labels and time series of the object pose labels for better synchronization with the time series of images captured in the image recording process. Additionally, in some embodiments, the method 100 incorporates a hand label correction process (block 160) in which the dataset collection system 10 in which the dataset collection system 10 fine-tunes the hand pose labels to image pairing. Finally, in some embodiments, the label recording and image recording processes are repeated until there is enough data (block 180) to form a robust hand-object interaction dataset for 3D hand-object interaction pose estimation.

FIG. 2D shows exemplary results of the dataset formation process. As can be seen, dataset images 142 are temporally paired with the corresponding hand pose labels (illustrated as hand joints and vertices 122) and object pose labels (illustrated as a bounding box 124). Thus, the user has successfully created a custom hand-object interaction dataset for 3D hand-object interaction pose estimation.

By employing the method 100, the dataset collection system 10 advantageously overcomes the hand-object occlusion issue. Unlike the prior dataset collection methods, the method 100 temporally decouples the physical-domain interaction, during which hand-object occlusions occur, from the labeling stage, during which 3D hand poses must be accurately tracked and labeled. By using AR to provide spatial references, the two temporally separated processes can be subsequently merged to generate the image-label pairs of the hand-object interaction dataset.

It should be appreciated that, with the hand-object interaction dataset, 3D hand-object interaction pose estimation models can be trained. Particularly, in at least some embodiments, the hand-object interaction dataset is used to train at least one machine learning model that configured to (i) receive input images of hand-object interactions and (ii) generate hand pose labels and object pose labels for the input images.

FIG. 3 shows exemplary components of an AR system 20 of the dataset collection system 10. It should be appreciated that the components of the AR system 20 shown and described are merely exemplary and that the AR system 20 may comprise any alternative configuration. Moreover, in the illustration of FIG. 2, only a single AR system 20 is shown. However, in practice the dataset collection system 10 may include one or multiple AR systems 20.

To enable the AR authoring environment, the dataset collection system 10 at least includes an AR system 20, at least part of which is worn or held by a user, and one or more objects 12 in the environment that can be interacted with by the user. The AR system 20 preferably includes an AR-HMD 23 having at least a camera and a display screen, but may include any mobile AR device, such as, but not limited to, a smartphone, a tablet computer, a handheld camera, or the like having a display screen and a camera. In one example, the AR-HMD 23 is in the form of an AR or virtual reality headset (e.g., Microsoft's HoloLens, Oculus Rift, or Oculus Quest) or equivalent AR glasses having an integrated or attached front-facing stereo-camera 29 (e.g., ZED Dual 4MP Camera (720p, 60 fps)).

In the illustrated exemplary embodiment, the AR system 20 includes a processing system 21, the AR-HMD 23, and (optionally) external sensors (not shown). In some embodiments, the processing system 21 may comprise a discrete computer that is configured to communicate with the AR-HMD 23 via one or more wired or wireless connections. In some embodiments, the processing system 21 takes the form of a backpack computer connected to the AR-HMD 23. However, in alternative embodiments, the processing system 21 is integrated with the AR-HMD 23. Moreover, the processing system 21 may incorporate server-side cloud processing systems.

The processing system 21 comprises a processor 25 and a memory 26. The memory 26 is configured to store data and program instructions that, when executed by the processor 25, enable the AR system 20 to perform various operations described herein. The memory 26 may be of any type of device capable of storing information accessible by the processor 25, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 25 may include a system with a central processing unit, graphics processing units, multiple processing units, dedicated circuitry for achieving functionality, programmable logic, or other processing systems.

The processing system 21 further comprises one or more transceivers, modems, or other communication devices configured to enable communications with various other devices. Particularly, in the illustrated embodiment, the processing system 21 comprises a Wi-Fi module 27. The Wi-Fi module 27 is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. As discussed in further detail below, the processor 25 is configured to operate the Wi-Fi module 27 to send and receive messages, such as control and data messages, to and from the IoT devices via the Wi-Fi network and/or Wi-Fi router. It will be appreciated, however, that other communication technologies, such as Bluetooth, Z-Wave, Zigbee, or any other radio frequency-based communication technology can be used to enable data communications between devices in the system 10.

The AR-HMD 23 comprises a display screen 28 and the camera 29. The camera 29 is configured to capture a plurality of images of the environment 50 as the head mounted AR device 23 is moved through the environment 50 by the user 15. The camera 29 is configured to generate image frames of the environment 50, each of which comprises a two-dimensional array of pixels. Each pixel has corresponding photometric information (intensity, color, and/or brightness). In some embodiments, the camera 29 is configured to generate RGB-D images in which each pixel has corresponding photometric information and geometric information (depth and/or distance). In such embodiments, the camera 29 may, for example, take the form of two RGB cameras configured to capture stereoscopic images, from which depth and/or distance information can be derived, or an RGB camera with an associated IR camera configured to provide depth and/or distance information.

The display screen 28 may comprise any of various known types of displays, such as LCD or OLED screens. In at least one embodiment, the display screen 28 is a transparent screen, through which a user can view the outside world, on which certain graphical elements are superimposed onto the user's view of the outside world. In the case of a non-transparent display screen 28, the graphical elements may be superimposed on real-time images/video captured by the camera 29. In further embodiments, the display screen 28 may comprise a touch screen configured to receive touch inputs from a user.

In some embodiments, the AR-HMD 23 may further comprise a variety of sensors 30. In some embodiments, the sensors 30 include sensors configured to measure one or more accelerations and/or rotational rates of the AR-HMD 23. In one embodiment, the sensors 30 comprises one or more accelerometers configured to measure linear accelerations of the AR-HMD 23 along one or more axes (e.g., roll, pitch, and yaw axes) and/or one or more gyroscopes configured to measure rotational rates of the AR-HMD 23 along one or more axes (e.g., roll, pitch, and yaw axes). In some embodiments, the sensors 30 include Lidar or IR cameras. In some embodiments, the sensors 30 may include inside-out motion tracking sensors configured to track human body motion of the user within the environment, in particular positions and movements of the head, arms, and hands of the user.

The AR-HMD 23 may also include a battery or other power source (not shown) configured to power the various components within the AR-HMD 23, which may include the processing system 21, as mentioned above. In one embodiment, the battery of the AR-HMD 23 is a rechargeable battery configured to be charged when the AR-HMD 23 is connected to a battery charger configured for use with the AR-HMD 23.

The program instructions stored on the memory 26 include a hand-object interaction dataset collection program 33. As discussed in further detail below, the processor 25 is configured to execute the hand-object interaction dataset collection program 33 to enable the collection of hand-object interaction datasets according to the methods described herein. In one embodiment, the hand-object interaction dataset collection program 33 is implemented with the support of Microsoft Mixed Reality Toolkit (MRTK), Final IK, and mesh effect libraries 2 3 4. In one embodiment, the hand-object interaction dataset collection program 33 includes an AR graphics engine 34 (e.g., Unity3D engine), which provides an intuitive visual interface for the hand-object interaction dataset collection program 33. Particularly, the processor 25 is configured to execute the AR graphics engine 34 to superimpose on the display screen 28 graphical elements for the purpose of collecting hand-object interaction datasets. In the case of a non-transparent display screen 28, the graphical elements may be superimposed on real-time images/video captured by the camera 29.

Methods for Hand-Object Interaction Dataset Collection

A variety of methods, workflows, and processes are described below for enabling the operations and interactions of the AR system 20 and the dataset collection system 10. In these descriptions, statements that a method, workflow, processor, and/or system is performing some task or function refers to a controller or processor (e.g., the processor 25) executing programmed instructions (e.g., the hand-object interaction dataset collection program 33, the AR graphics engine 34) stored in non-transitory computer readable storage media (e.g., the memory 26) operatively connected to the controller or processor to manipulate data or to operate one or more components in the dataset collection system 10 to perform the task or function. Additionally, the steps of the methods may be performed in any feasible chronological order, regardless of the order shown in the figures or the order in which the steps are described.

Additionally, various AR graphical user interfaces are described for operating the AR system 20. In many cases, the AR graphical user interfaces include graphical elements that are superimposed onto the user's view of the outside world or, in the case of a non-transparent display screen 28, superimposed on real-time images/video captured by the camera 29. In order to provide these AR graphical user interfaces, the processor 25 executes instructions of the AR graphics engine 34 to render these graphical elements and operates the display 28 to superimpose the graphical elements onto the user's view of the outside world or onto the real-time images/video of the outside world. In many cases, the graphical elements are rendered at a position that depends upon positional or orientation information received from any suitable combination of the sensors 30 and the camera 29, so as to simulate the presence of the graphical elements in real-world the environment. However, it will be appreciated by those of ordinary skill in the art that, in many cases, an equivalent non-AR graphical user interface can also be used to operate the hand-object interaction dataset collection program 33, such as a user interface provided on a further computing device such as laptop computer, tablet computer, desktop computer, or a smartphone.

Moreover, various user interactions with the AR graphical user interfaces and with interactive graphical elements thereof are described. In order to provide these user interactions, the processor 25 may render interactive graphical elements in the AR graphical user interface, receive user inputs from, for example via gestures performed in view of the one of the camera 29 or other sensor, and execute instructions of the hand-object interaction dataset collection program 33 to perform some operation in response to the user inputs.

Finally, various forms of motion tracking are described in which spatial positions and motions of the user or of other objects in the environment are tracked. In order to provide this tracking of spatial positions and motions, the processor 25 executes instructions of the hand-object interaction dataset collection program 33 to receive and process sensor data from any suitable combination of the sensors 30 and the camera 29, and may optionally utilize visual and/or visual-inertial odometry methods such as simultaneous localization and mapping (SLAM) techniques.

Bounding Contour Creation

Two major considerations affect the quality of a hand-object interaction dataset, and therefore, affect the performance of any model trained for 3D pose estimation using the dataset. Firstly, the orientation of the 3D bounding box labels in the hand-object interaction dataset should precisely represent the orientation of the physical object, and this orientation alignment should be consistent for all the potential poses of the physical object. For instance, from the perspective shown in FIG. 2B, the 'upward' direction of the bounding box should point upwards, the 'forward' direction of the bounding box faces towards the head of the car, and the 'right' direction is perpendicular to both the other two. Secondly, the physical object captured in the images of the hand-object interaction dataset should be accurately enclosed by the bounding box and with the smallest volume given the orientation mentioned before. Moreover, in addition to these considerations, it is important that users can easily recognize the orientation of the bounding box in the animation during the image recording process, which can be challenging when an overly simple shape is used as the bounding box.

Figure 4:
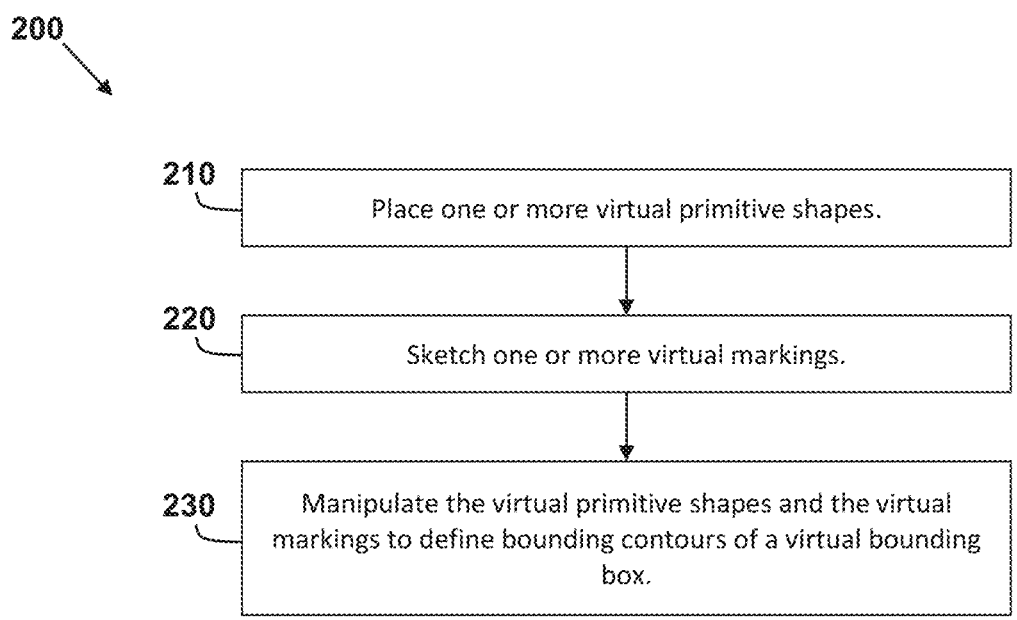
FIG. 4 shows a flow diagram for a method for bounding contour creation.

FIG. 4 shows a flow diagram for a method 200 for bounding contour creation. The method 200 is one exemplary embodiment of the bounding contour creation process (block 110) in which the dataset collection system 10 generates based on user inputs, a virtual bounding box for a physical object that is to be interacted with. The method 200 addresses the considerations mentioned above by advantageously enabling the user to define a plurality of bounding contours that form a bounding box having an arbitrarily complex shape, in contrast to a simple cube bounding box. Such bounding contours can advantageously define a more recognizable, and tighter fitting, bounding box that better represents the geometric shape and characteristic features of a physical object.

Figure 5:
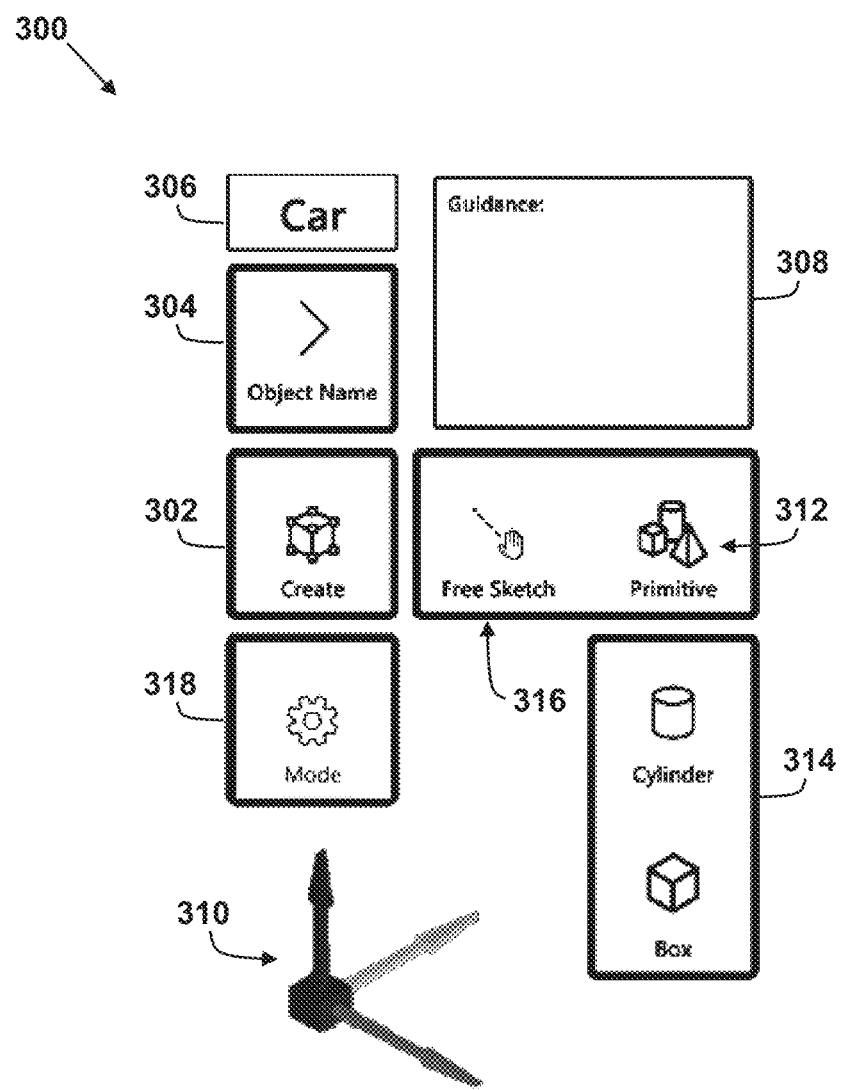
FIG. 5 shows an exemplary menu for operating the dataset collection system during the bounding contour creation process.

FIG. 5 shows an exemplary menu 300 for operating the dataset collection system 10 during the bounding contour creation process. In some embodiments, the menu 300 is a floating menu that superimposed upon environment within the AR graphical user interfaces and may, for example, float next to a left hand or non-dominant hand of the user. The menu 300 has a create option 302 that can be selected by the user to begin the bounding contour creation process for a new object. Additionally, the menu 300 has an object name option 304 that can be selected by the user to change a name 306 of the new object for which bounding contours are being created. In some embodiments, textual guidance is provided in a guidance box 308 of the menu 300 for guiding the user through the bounding contour creation process. In some embodiments, a coordinate icon 310 is displayed (e.g., fixed in mid-air) in the AR graphical user interface to indicate the orientation of the virtual bounding box that is being created by the user.

With reference again to FIG. 4, the method 200 provides two distinct mechanisms for creating a set of bounding contours that define a bounding box. As a first mechanism for creating bounding contours, the method 200 allows a user to place one or more virtual primitive shapes (block 210). Particularly, based on user inputs, the processor 25 selects a virtual shape from a plurality of predefined virtual shapes, which may also be referred to herein as "primitives." With reference to FIG. 5, the menu 300 has a primitive option 312 that can be selected by the user to select a virtual primitive to place into the AR environment, via a shape submenu 314. The available virtual primitives may include common 3D shapes, such as cubes, prisms, spheres, cylinders, pyramids, cones, and the like, but may also include 2D shapes that can be placed into the 3D space, such as squares, rectangles, circles, triangles, and the like. After selecting the virtual shape, the processor 25 operates the display screen 28 to display an AR graphical user interface that includes the selected virtual shape superimposed on the environment.

For objects with non-symmetric but regular geometric features, such as a milk box or a cooking pan, it is feasible to segment such an object into a combination of different standard virtual primitives. However, for objects having complex curves, such as a cup or a spray bottle, it can be challenging to represent the object using only the standard virtual primitives. To this end, as a second mechanism for creating bounding contours, the method 200 allows a user to sketch one or more virtual markings (block 210). Particularly, based on free-form hand motions performed by the user, the processor 25 generates a virtual marking. As the user moves his or her hand or finger through the air, the processor 25 operates the display screen 28 to display, in the AR graphical user interface, the virtual marking superimposed in the environment along the path of the user's hand or finger. With reference to FIG. 5, the menu 300 has a free-sketch option 316 that can be selected by the user to begin creating a virtual marking using free-form hand motions.

Figure 6A:
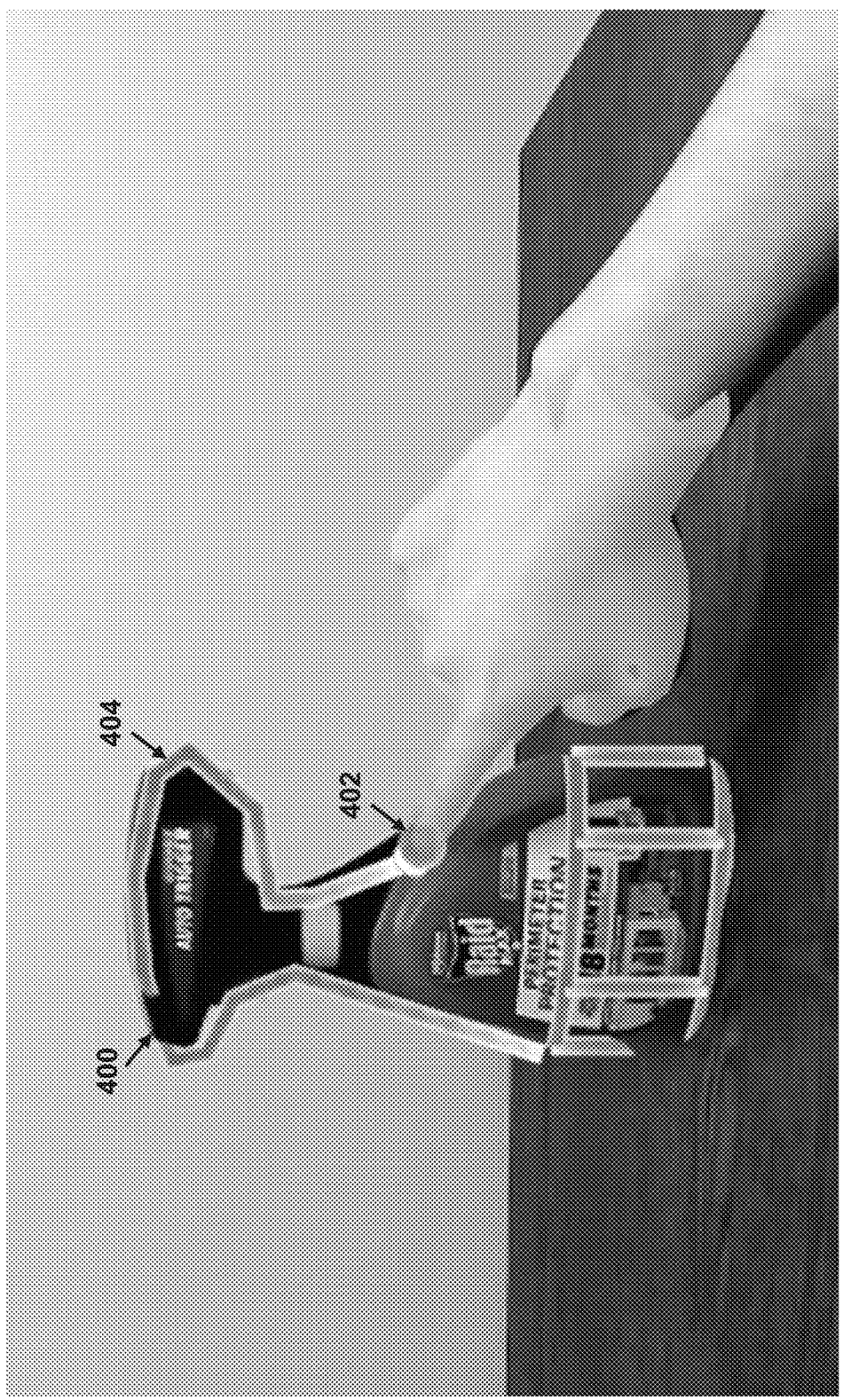
FIG. 6A shows a user creating virtual markings that define bounding contours of a spray bottle.

FIG. 6A shows a user creating virtual markings that define bounding contours of a spray bottle 400. As can be seen, a virtual brush tip 402 is attached on the index fingertip of the user's dominant hand while directly touching the spray bottle 400. When the user performs a pinch gesture with his or her hand other hand, the processor 25 starts to generate and display a virtual marking 404 based on position of the virtual brush tip 402. The user can directly touch the spray bottle 400 to get haptic feedback to improve the drawing accuracy.

Returning to FIG. 4, the method 200 allows a user to manipulate the virtual primitive shapes and the virtual markings to define bounding contours of a virtual bounding box (block 230). Particularly, based on user inputs, the processor 25 manipulates at least one of a size, orientation, and position of the virtual shape(s) and/or virtual marking(s) that were placed into the AR environment. During the manipulations, the processor 25 operates the display screen 28 to display, in the AR graphical user interface, the manipulations of the virtual shape(s) and/or virtual markings in real-time to provide a visual reference for the user. With reference to FIG. 5, the menu 300 has a mode option 318 via which the user can switch to a deletion mode. In the deletion mode, the user can delete a virtual marking or a virtual primitive by simply touching the element to be deleted using the index finger, or similar.

Figure 6B:
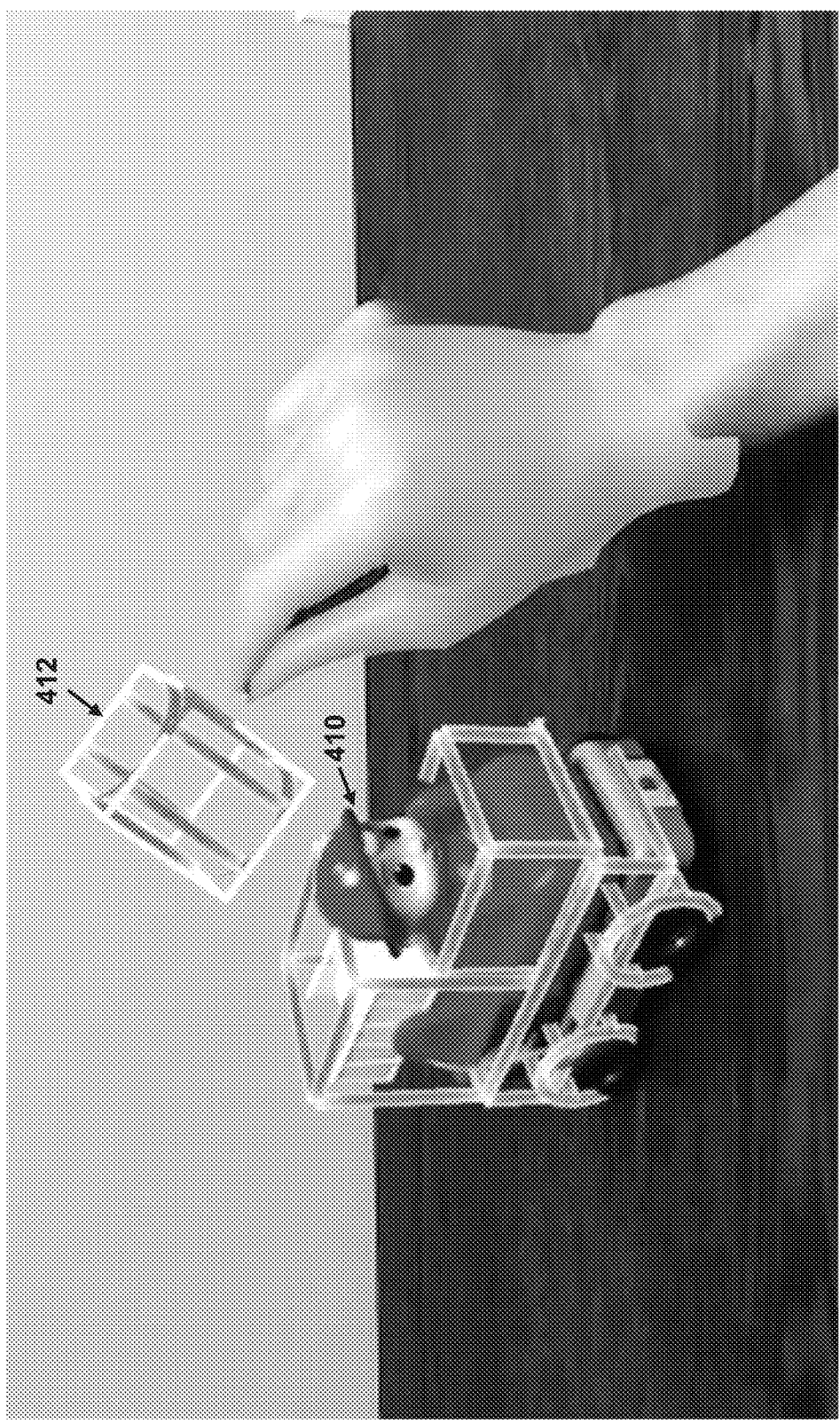
FIG. 6B shows a user manipulating virtual primitives that define bounding contours of a toy car.

FIG. 6B shows a user manipulating virtual primitives that define bounding contours of a toy car 410. As can be seen, the user may perform a grabbing gesture to select a particular virtual marking or shape, and use freehand motions to adjust a position and orientation of the selected virtual marking or shape. In the illustration, the user has selected a cylinder virtual primitive shape 412 and is placing it around a head of the toy car 410. Additionally, further freehand gestures can be used to adjust a size of the selected virtual marking or shape.

When the user is finished manipulating the virtual shape(s) and/or virtual marking(s), the processor 25 defines a virtual bounding box from for a particular physical object based on the sizes, orientations, and positions of the virtual shape(s) and/or virtual markings. Particularly, the virtual shape(s) and/or virtual markings define a plurality of bounding contours that collectively form a virtual bounding box for the physical object. In some embodiments, the processor 25 automatically converts the virtual shape(s) and/or virtual markings into a standardized bounding box format used in the computer vision industry.

Figure 7A:
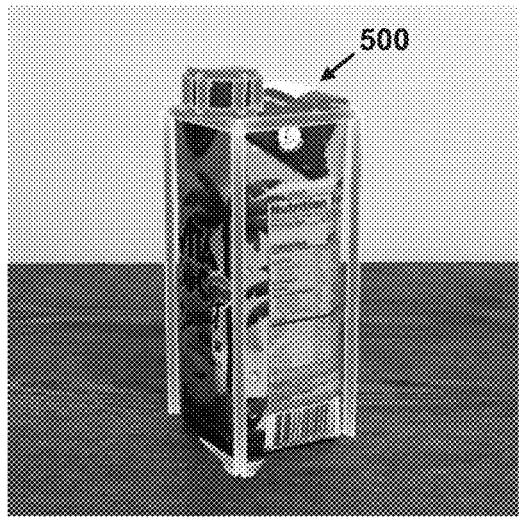
FIGS. 7A-7D show exemplary virtual bounding boxes created using the dataset collection system.
Figure 7B:
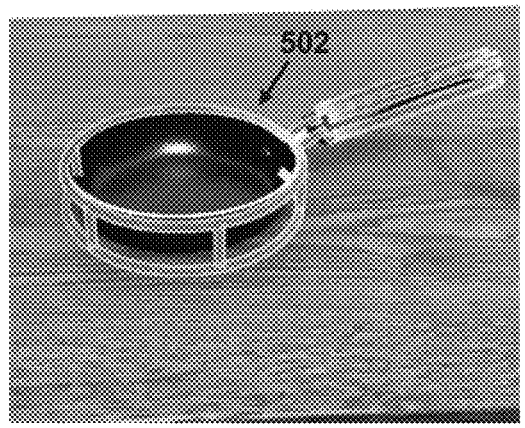
Figure 7C:
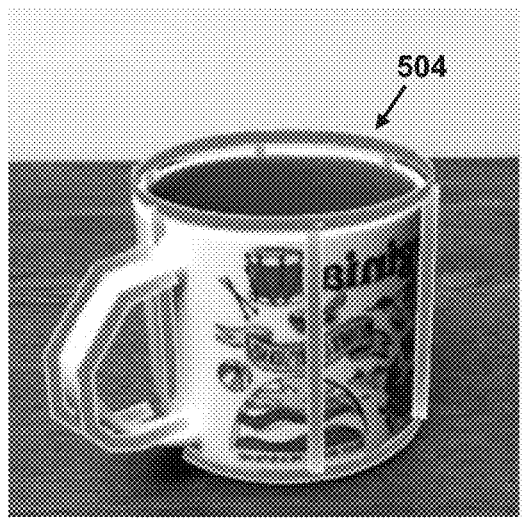
Figure 7D:
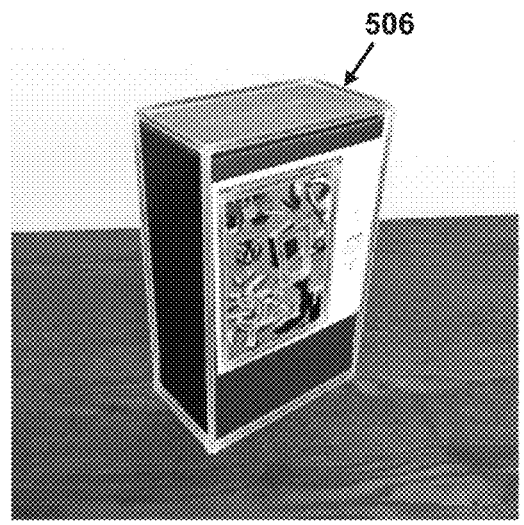

Thus, it should be appreciated that, the user can create and manipulate the virtual shape(s) and/or virtual markings to define the virtual bounding box for any physical object having any arbitrary shape. FIGS. 7A-7C show exemplary virtual bounding boxes created using the dataset collection system 10. In FIG. 7A, a drink bottle 500 is represented by a cuboid for the main body and a small cylinder to indicate the cap. In FIG. 7B, a pan 502 is represented by a shallow cylinder for the pan body and rectangular prisms to define the handle. In FIG. 7C, a cup 504 is represented by cylinder for the main body and free-sketched virtual markings that define irregular curves of the handle. Finally, in FIG. 7D, a cardboard box 506 is represented by a rectangular prism for the main body and free-sketched virtual markings are used to define identifiable markings (e.g., a logo, or similar) on the cardboard box 506, that help to indicate an orientation of the cardboard box 506. From these examples, it should be appreciated that users can freely utilize the combination of virtual primitive shapes, and free-sketched virtual markings to define bounding boxes for physical objects having any shape.

Label Recording

Figure 8:
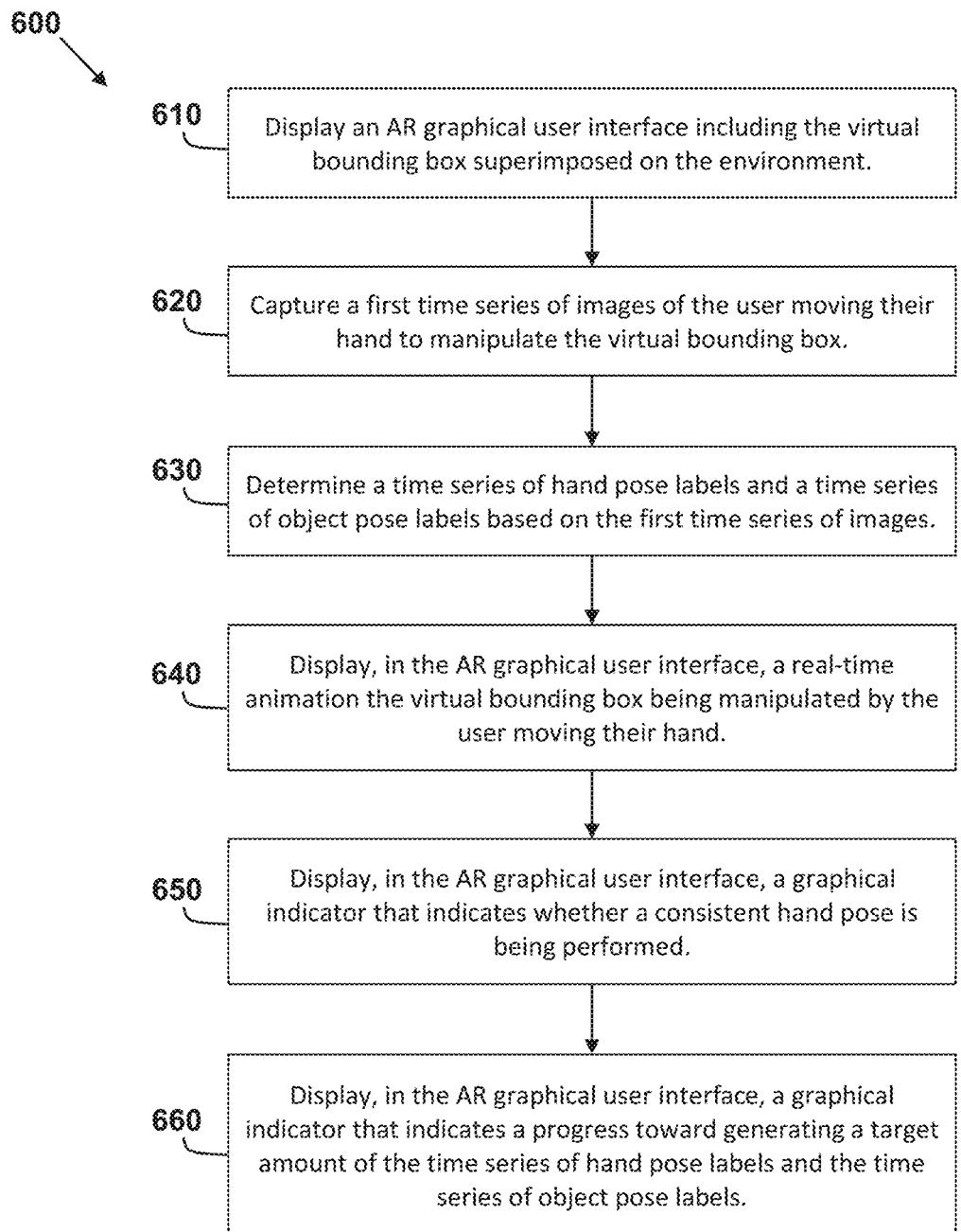
FIG. 8 shows a flow diagram for a method for label recording.

FIG. 8 shows a flow diagram for a method 600 for label recording. The method 600 is one exemplary embodiment of the label recording process (block 120) in which the dataset collection system 10 generates a time series of hand pose labels and a time series of object pose labels. Instead of generating images and labels of a hand-object interaction dataset concurrently, or first collecting then images then labeling them in a post-hoc process, the method 600 allows a user to record a time series of hand pose labels and a time series of object pose labels, i.e., an interaction clip, which is subsequently paired with images recorded in separate process. Advantageously, the interaction clip is recorded by manipulating the previously created virtual bounding box, rather than by manipulating the physical object. In this way, hand poses can be more accurately tracked without the issue of the physical object occluding part of the hand.

Figure 9:
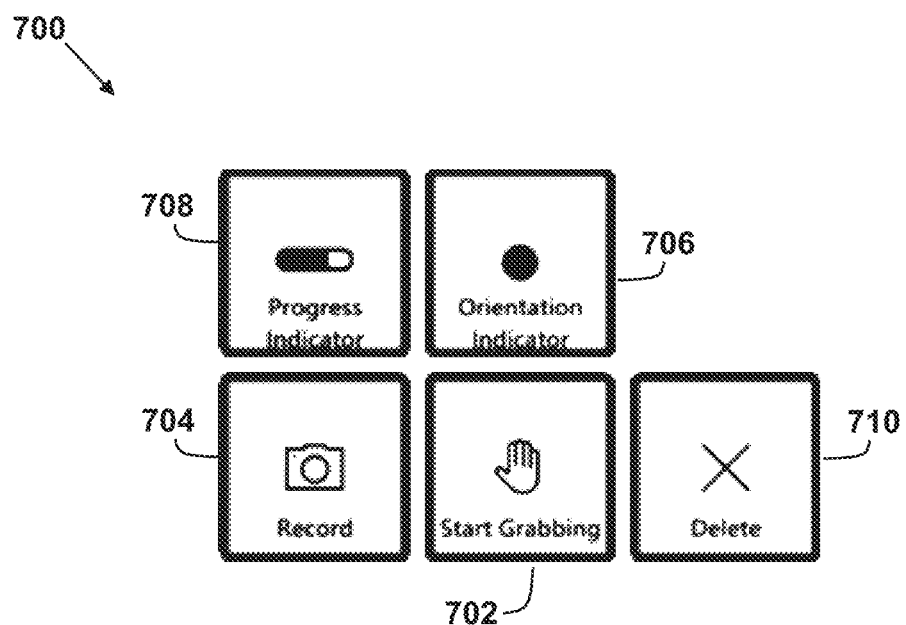
FIG. 9 shows an exemplary menu for operating the dataset collection system during the label recording process.

FIG. 9 shows an exemplary menu 700 for operating the dataset collection system 10 during the label recording process. In some embodiments, the menu 700 is a floating menu that superimposed upon environment within the AR graphical user interfaces and may, for example, float next to a left hand or non-dominant hand of the user. In addition to other options discussed below, the menu 700 has a delete option 708 via which the user can delete virtual bounding box and interaction clips associated therewith, in the event that the user would like to start over from scratch.

Returning to FIG. 8, the method 600 begins with displaying an AR graphical user interface including the virtual bounding box superimposed on the environment (block 610). Particularly, the processor 25 operates the display screen 28 to display an AR graphical user interface that includes the virtual bounding box that was previously created by the user superimposed on the environment. As discussed below, the user will record an interaction clip by virtually grabbing the virtual bounding box with their hand and manipulating the virtual bounding by moving their hand.

The method 600 continues with capturing a first time series of images of the user moving their hand to manipulate the virtual bounding box (block 620). Particularly, as the user moves their hand to virtually grab and manipulate the virtual bounding box, the camera 25 of the AR-HMD 23 captures a time series of images of the user's hand. The time series of images may, for example, be saved with a pre-defined resolution (e.g., 1280×720) and captured at a predetermined framerate (e.g., 15 frames per second). The time series of images may comprise RGB-D images in which each pixel has corresponding photometric information and geometric information (depth and/or distance). However, in other embodiments, the time series of images may comprise stereoscopic images, from which depth and/or distance information can be derived.

With reference to FIG. 9, the menu 700 has a start grabbing option 702 and a record option 704 via which the user can manage the process for label recording. Particularly, in an exemplary embodiment, a user first grabs the physical object using a preferred hand pose and/or grabbing gesture, and aligns it with the virtual bounding box that is superimposed upon the environment in mid-air. After aligning the physical object with the virtual bounding box, the user selects the start grabbing option 702 from the menu 700, which causes the virtual bounding box to visually snap to the user's hand in the AR graphical user interface, such that the virtual bounding box can be manipulated. Next, the user releases the physical object (e.g., with the other hand) while keeping the hand pose unchanged. At this point, the user can freely move his or hand throughout the environment while maintaining the same hand pose to virtually manipulate the virtual bounding box (i.e., move and rotate the virtual bounding box). Once the user is ready to record an interaction clip, the user selects the record option 704 from the menu, which causes the camera 29 to begin capturing the time series of images.

The method 600 continues with determining a time series of hand pose labels and a time series of object pose labels based on the first time series of images (block 630). Particularly, the processor 25 determines the time series of hand pose labels based on the time series of images of the manipulations of the virtual bounding box. Next, the processor 25 determines the time series of object pose labels based on the time series of hand pose labels. In one embodiment, the virtual bounding box is rigidly attached to a virtual anchor and the processor 25 determines the object pose labels as the average position and rotation of the user's five fingertips relative to an initial rotation at the time of virtually grabbing the virtual bounding box. In at least one embodiment, the interaction clip is determined as a time series of pose frames $[f_1, f_2, \ldots, f_n]$, where each pose frame of the interaction clip includes: (1) a respective timestamp ($f_i \cdot t$), (2) hand pose labels including of a plurality of hand joint positions ($f_i \cdot h$), e.g., 21 hand joint positions, at the respective timestamp ($f_i \cdot t$), and (3) object pose labels including a position ($f_i \cdot pos$) and a rotation ($f_i \cdot rot$) of the virtual bounding box at the respective timestamp ($f_i \cdot t$). In one embodiment, the processor 25 saves the object pose labels using the Objectron dataset format and saves the hand pose labels using the Panoptic Dataset format.

The method 600 continues with displaying, in the AR graphical user interface, a real-time animation the virtual bounding box being manipulated by the user moving their hand (block 640). Particularly, the processor 25 operates the display screen 28 to display, in the AR graphical user interface, a real-time animation of the manipulations of the virtual bounding box corresponding to the real-time motions of the user's hand based on the time series of hand pose labels and/or the time series of object pose labels. In other words, as the user moves his or her hand through the environment, the rendering of the virtual bounding box in the AR graphical user interface is animated to move with the user's hand to simulate virtually grabbing and manipulating the virtual bounding box.

Figure 10A:
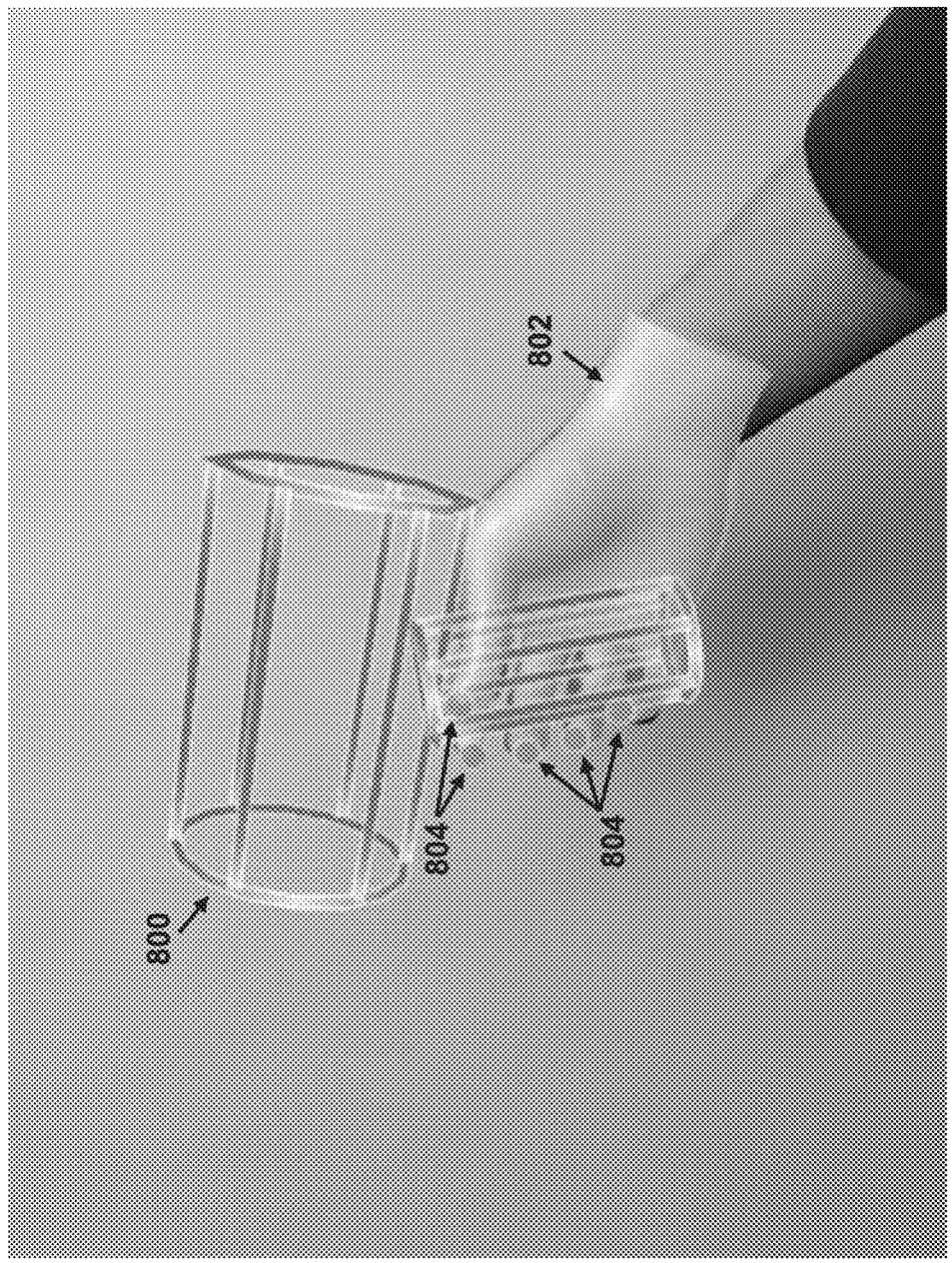
FIG. 10A shows exemplary gesture indicators for guiding the user in maintaining a same gesture while manipulating the virtual bounding box.

The method 600 continues with displaying, in the AR graphical user interface, a graphical indicator that indicates whether a consistent hand pose is being performed (block 650). Particularly, the processor 25 operates the display screen 28 to display, in the AR graphical user interface, in real time, a graphical indicator that indicates whether the user is performing a predetermined hand pose with their hand. In particular, the graphical indicator indicates whether the user has maintained the same hand pose that was originally used the virtually grab the virtual bounding box (e.g., at the time the user selected the start grabbing option 702 from the menu 700). In one embodiment, the graphical indicator includes a graphical representation of a current hand pose being performed by the user (e.g., a 3D model of a hand). In one embodiment, the graphical indicator includes one or more visual indicators that indicate whether each finger of the user's hand is currently positioned according to the same hand pose that was originally used the virtually grab the virtual bounding box It should be appreciated that, unlike holding a physical object, it is difficult for the user to keep the gesture unchanged when grabbing a virtual object due to the lack of haptic feedback. FIG. 10A shows exemplary gesture indicators 804 for guiding the user in maintaining a same gesture while manipulating the virtual bounding box. As the user manipulates the virtual bounding box 800, the AR graphical user interface includes a graphical representation 802 (e.g., 3D model) of a current hand pose being performed by the user. Additionally, the AR graphical user interface includes gesture indicators 804 located at the tip of each finger of the user's hand. During recording, each gesture indicator 804 turns a first color (yellow) to warn the user when the finger moves beyond a first threshold (e.g., 1 cm) from the initial pose. Additionally, each gesture indicator 804 turns a second color (red) the to warn the user when the finger moves beyond a second threshold (e.g., 1.5 cm) from the initial pose. In some embodiments, the processor 25 marks a pose frame of the interaction clip as being invalid in response to more than two gesture indicator 804 turning the second color (e.g., red), and deletes the pose frame from the interaction clip.

The method 600 continues with displaying, in the AR graphical user interface, a graphical indicator that indicates a progress toward generating a target amount of the time series of hand pose labels and the time series of object pose labels (block 660). Particularly, the processor 25 operates the display screen 28 to display, in the AR graphical user interface, in real time, one or more graphical indicators that indicates a progress toward generating the time series of hand pose labels and the time series of object pose labels. In one embodiment, a first graphical indicator indicates whether object pose labels in the time series of object pose labels have been generated with respect to a plurality of target orientations of the virtual bounding box. For example, it may be desirable to collect data from a variety of different viewpoints and/or orientations of the virtual bounding box. In another embodiment, a second graphical indicator indicates a progress toward generating a target amount of the time series of hand pose labels and the time series of object pose labels. For example, a predetermined target number of pose frames of the interaction clip may be set that represents an adequately large dataset for later training a model for 3D pose estimation.

It should be appreciated that, training an effective 3D pose estimation model (e.g., a neural network) requires a hand-object interaction dataset that is diverse and that contains an adequate amount of data. To guarantee the robustness of the 3D pose estimation model, in some embodiments, the dataset collection system 10 utilizes two indicators guiding users to achieve the corresponding requirements, namely, an orientation indicator and a progress indicator. Users can use the orientation indicator to check whether they have manipulated the virtual bounding box from different target viewpoints or target orientations, which ensures that different poses of the physical object will be included in the dataset. The progress indicator informs users how many pose frames have been created so far and how many pose frames are left to reach a recommended dataset size.

Figure 10B:
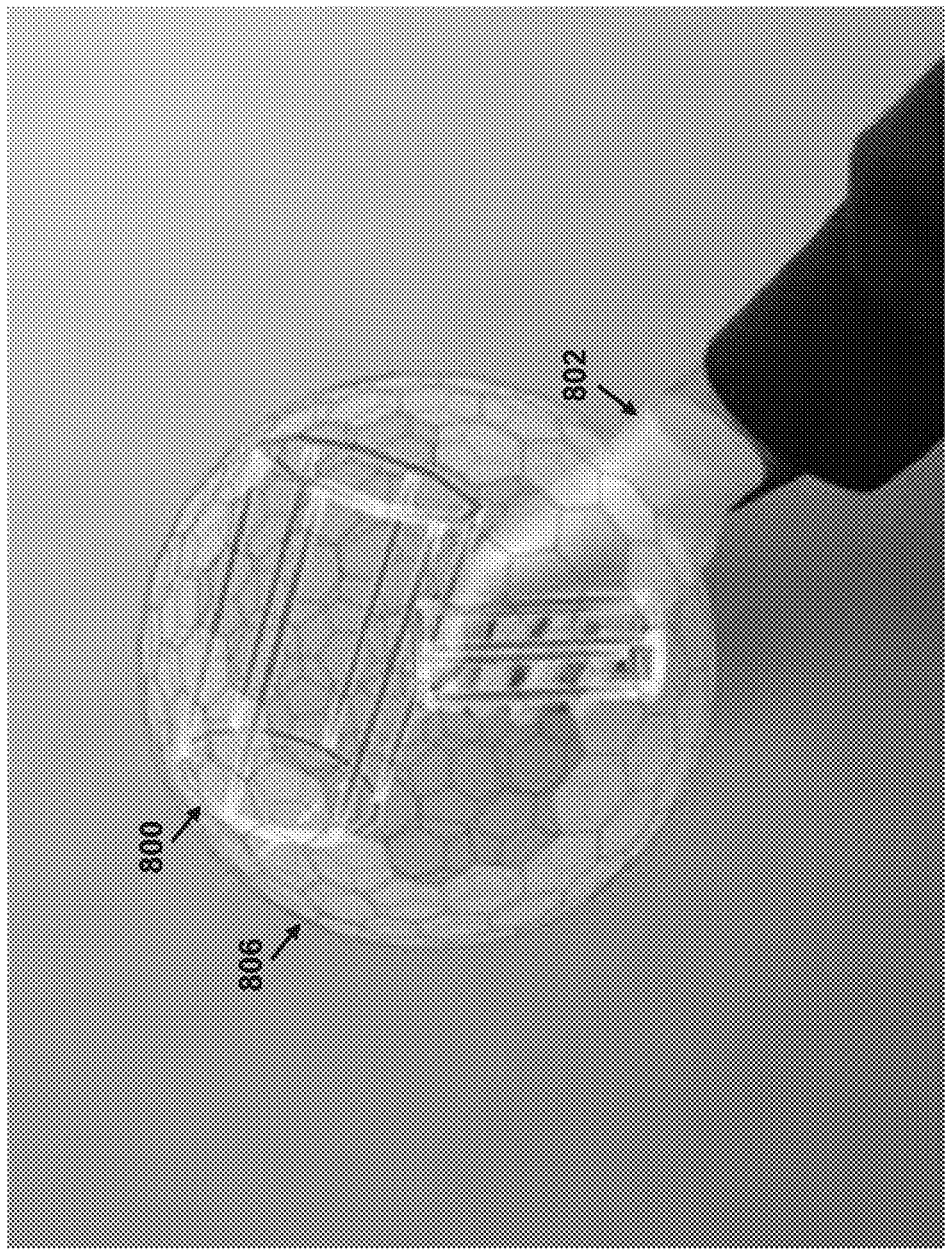
FIG. 10B shows an orientation indicator that informs the user as to whether different viewpoints have been captured.

FIG. 10B shows an orientation indicator 806 that informs the user as to whether different viewpoints have been captured. The orientation indication 806 is bound with the virtual bounding box 800, and includes a sphere of hexa-tiles. The hexa-tiles change visually (e.g., transition from opaque to transparent, or change color) to indicate that a pose frames for the corresponding orientation of the virtual bounding box 800 has been captured in the interaction clip. In some embodiments, after the user grabs the virtual bounding box 800, the processor 23 casts a ray from the AR-HMD 23 toward a center of the virtual bounding box 800. When the label recording starts, the processor 25 visually changes and/or hides the hexa-tiles that lie around the intersection point between the casted ray and the orientation indicator 806. With the orientation indicator 806, users are encouraged to record multiple interaction clips in as many ways as they may grab the object in real application scenarios. With reference again to FIG. 9, the menu 700 has an orientation indicator option 70 via which the user can toggle the orientation indicator 806 on and off.

Figure 10C:
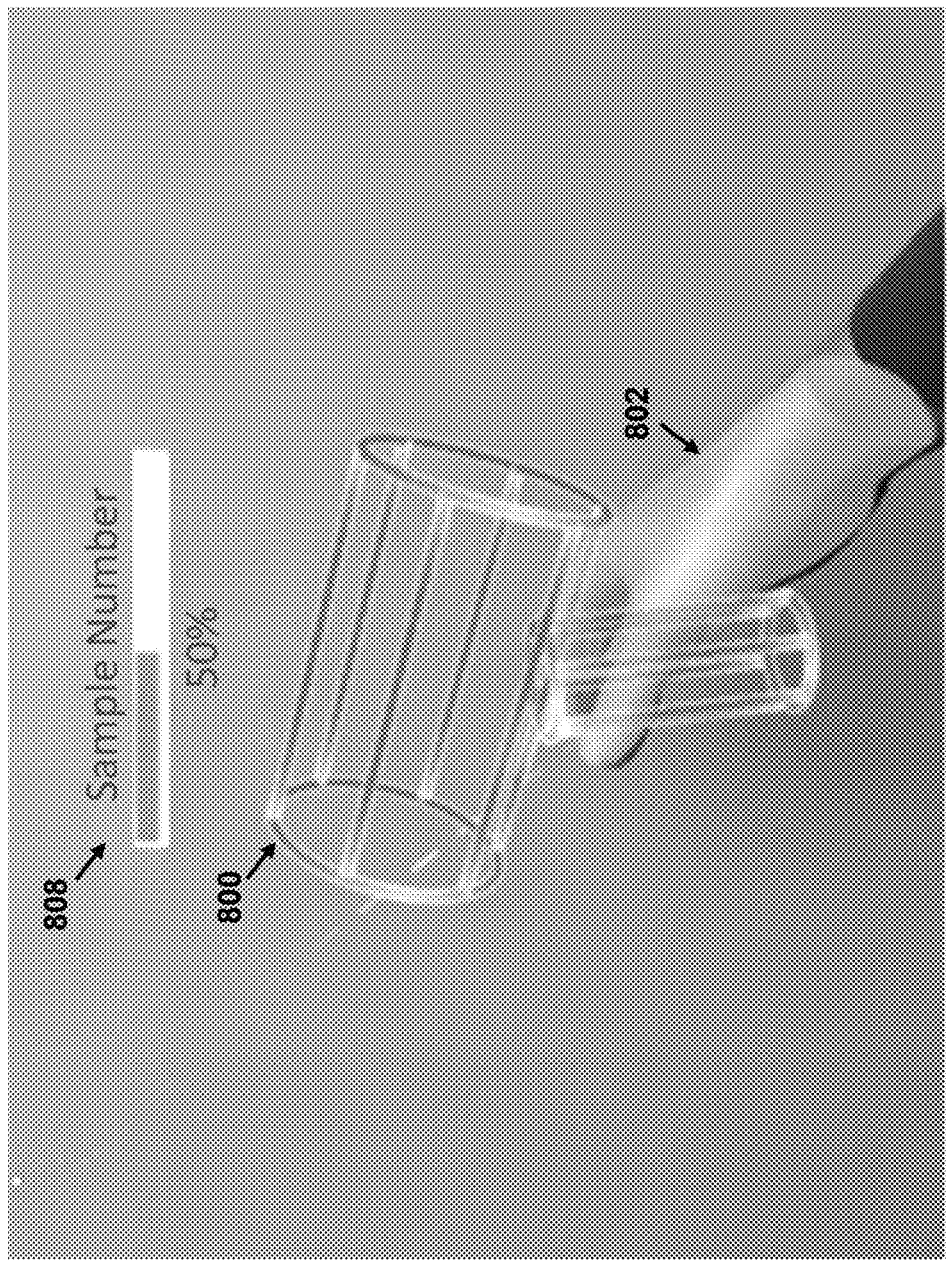
FIG. 10C shows a progress indicator that indicates an overall dataset collection progress.

FIG. 10C shows a progress indicator 808 that indicates an overall dataset collection progress. The progress indicator 808 floats above the virtual bounding box 800 and takes the form of a progress bar representing the percentage of the pose frames collected out of the target number of pose frames for the hand-object interaction dataset. Users are expected to achieve full progress for the dataset collection. With reference again to FIG. 9, the menu 700 has a progress indicator option 708 via which the user can toggle the progress indicator 808 on and off.

To determine a proper dataset size that can achieve decent performance results, the target 3D hand pose estimation model and the target 3D object pose estimation model can be trained with different dataset sizes (1 k, 1.5 k, . . . , 5 k). The target dataset size can be chosen to be, for example, 2.5 k samples/frames for each object category, based on the dataset size determined to be required reach performance results comparable with bench-marking datasets. During training, data in each object category can be shuffled and, for example, 80% of images can be used for training while 20% of images can be used for testing. In at least some embodiments, the dataset collection system 10 targets user-specified application scenarios rather than large common datasets. In such embodiments, since the 3D pose estimation models are trained for a user's customized usage, a large-scale dataset isn't necessarily needed and the target data size can be empirically set according to the preliminary training performance assessment.

In some embodiments, during the label recording process, the processor 25 operates the display screen 28 to display, in the AR graphical user interface, text guidance to the user. In one example, the guidance indicates that the user should manipulate the virtual bounding box in particular manners that are advantageous for building a robust set of interaction clips for a hand-object interaction dataset. Particularly, there are benefits to separating the degrees-of-freedom (DoF) when manipulating a virtual bounding box. In order to ensure users can accurately follow the recorded interaction clip in the image recording, the dataset collection system 10 may encourage or require users to interact with the bounding contour in two distinct manners, namely, translation-dominant manipulation and rotation-dominant manipulation. For the translation-dominant manipulation, users move the bounding contour in any trajectory they prefer without rotating their wrists, while for the rotation-dominant manipulation, users majorly rotate the bounding contour without moving it in space. Such manipulations will be easier to mimic during the image recording process. The textual guidance is provided accordingly in the AR user interface.

In at least some embodiments, prior to the image recording process, the processor 25 temporally smooths the time series of hand pose labels and the time series of object pose labels generated in the label recording process. Particularly, when recording the labels, users may suddenly start/stop a movement or rapidly change the translation and rotation direction, which causes large velocity changes. Such cases will tend to increase the spatial inaccuracy of the subsequently recorded images in the image recording process. FIG. 11 shows pseudocode for an algorithm for temporally smoothing an interaction clip by clamping the linear and angular accelerations of the bounding contour. The algorithm is one exemplary embodiment of the interaction clip smoothing process (block 130) in which the dataset collection system 10 smooths the time series data of the interaction clip. In summary, the processor 25 batches the recorded pose frames $[f_1, f_2, \ldots, f_n]$ of the interaction clip as $[b_1, \ldots, b_{n/k}]$, where each batch $b_i$ contains k consecutive pose frames, denoted as $[f_{i1}, f_{i2}, \ldots, f_{ik}]$. For each batch $b_i$, the processor 25 first calculates an average linear ($b_i \cdot v$) velocity and an average angular ($b_i \cdot \omega$) velocity. Next, the processor 25 calculates the linear accelerations as $b_i \cdot a = (b_i \cdot v - b_{i-1} \cdot v)/(f_{i0} \cdot t - f_{(i-1)0} \cdot t)$ and calculates angular accelerations as $b_i \cdot \alpha = (b_i \cdot \omega - b_{i-1} \cdot \omega)/(f_{i0} \cdot t - f_{(i-1)0} \cdot t)$, where i=1, . . . , n/k. The processor 25 compares the acceleration values $b_i \cdot acce$ (acce∈{a, α}) with corresponding thresholds $acce_{max}$. In response to an acceleration value $b_i \cdot acce(acce \in \{a, \alpha\})$ exceeding the corresponding threshold $acce_{max}$, processor 25 increases the timestamps of all the frames within and after the current batch $b_i$ by a calculated value so that the new acceleration of the current batch is equal to the corresponding threshold. In one embodiment, a maximum offset $\Delta t_{max}$ (e.g., 0.5 seconds) is set for the added time duration that limits the increase to the timestamps of the current batch.

Image Recording

Figure 12:
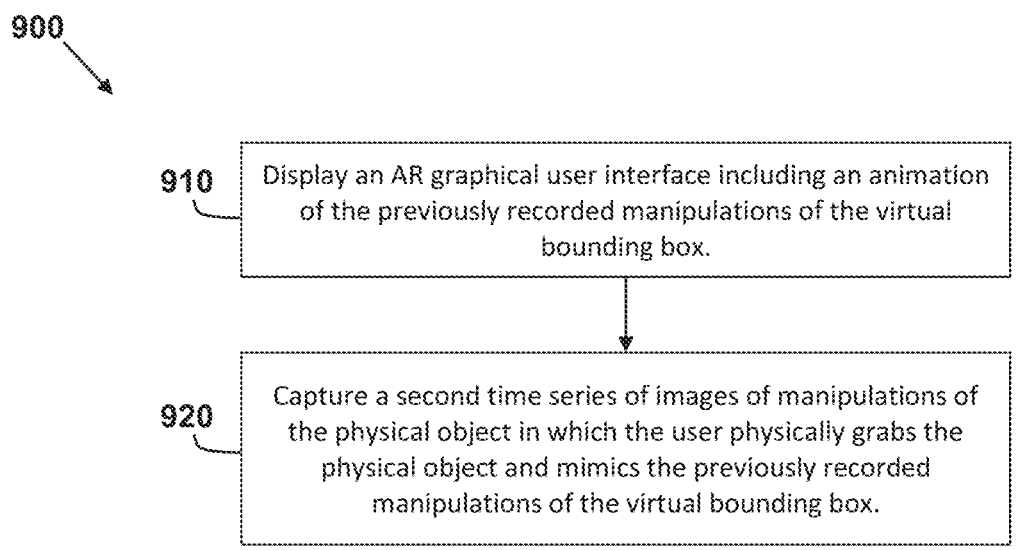
FIG. 12 shows a flow diagram for a method for image recording.

FIG. 12 shows a flow diagram for a method 900 for image recording. The method 900 is one exemplary embodiment of the image recording process (block 140) in which the dataset collection system 10 captures a time series of images of manipulations of the physical object. As discussed above, the interaction clip is initially recorded as a time series of pose frames $[f_1, f_2, \ldots, f_n]$, where each frame of the interaction clip includes a timestamp ($f_i \cdot t$), a hand joint positions ($f_i \cdot h$) of the hand and a position ($f_i \cdot pos$) and a rotation ($f_i \cdot rot$) of the virtual bounding box. However, in order to complete the hand-object interaction dataset, each pose frame $f_i$ must be associated with an image ($f_i \cdot g$) in which the user's hand is interacting with the corresponding physical object. At this state no suitable images have yet been captured.

Figure 13:
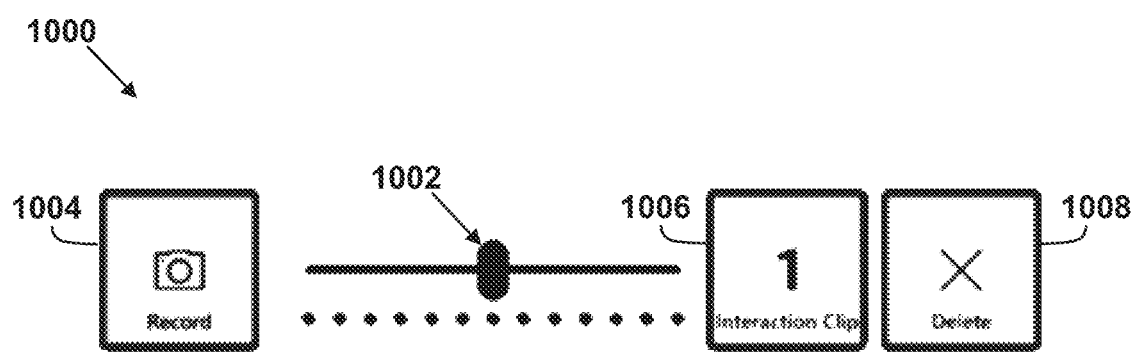
FIG. 13 shows an exemplary menu for operating the dataset collection system during the image recording process.

FIG. 13 shows an exemplary menu 1000 for operating the dataset collection system 10 during the image recording process. In some embodiments, the menu 1000 is a floating menu that superimposed upon environment within the AR graphical user interfaces and may, for example, float next to a left hand or non-dominant hand of the user. In addition to other options discussed below, the menu 1000 has a delete option 1008 via which the user can delete the interaction clip if needed.

Returning to FIG. 12, the method 900 begins with displaying an AR graphical user interface including an animation of the previously recorded manipulations of the virtual bounding box (block 910). Particularly, the processor 25 operates the display screen 28 to display, in the AR graphical user interface, an animation of the virtual bounding box spatially moving according to the previously performed manipulations of the virtual bounding box. The processor 25 generates the animation of the virtual bounding box based on the time series of hand pose labels and/or the time series of object pose labels of the interaction clip. In at least one embodiment, the animation further includes a graphical representation of the particular hand pose with which the user is to physically grab the physical object to mimic the previously performed manipulations of the virtual bounding box. In one embodiment, the processor 25 adjusts, based on user inputs, a playback speed of the animation of the virtual bounding box. With reference again to FIG. 13, the menu 1000 has a speed slider 1002 via which the user can adjust the playback speed. In this way, the user can more confidently mimic the motions of the animation in real-time with the physical object. In some embodiments, the menu 1000 and/or the AR graphical user interface includes textual guidance and/or other visual hints to guide the user to in mimic the motions of the animation.

Next, the method 900 continues with capturing a second time series of images of manipulations of the physical object in which the user physically grabs the physical object and mimics the previously recorded manipulations of the virtual bounding box (block 920). Particularly, as the user moves their hand, now holding the physical object, and manipulates the physical object in a manner so as to mimic the motions of the animation, the camera 25 of the AR-HMD 23 captures a time series of images of the user's hand holding the physical object. The time series of images may, for example, be saved with a predefined resolution (e.g., 1280×720) and captured at a predetermined framerate (e.g., 15 frames per second). The time series of images may comprise RGB-D images in which each pixel has corresponding photometric information and geometric information (depth and/or distance). However, in other embodiments, the time series of images may comprise stereoscopic images, from which depth and/or distance information can be derived.

With reference again to FIG. 13, the menu 1000 has a record option 1004 via which the user can the image recording process to begin. In one embodiment, the AR graphical user interface includes a visual countdown (e.g., 5 seconds), during which the user preemptively aligns the physical object with the animation, which is frozen during the countdown. Once the countdown concludes, the animation begins and camera 25 begins capturing images. During recording, the menu 1000 is hidden to prevent distraction of the user during the manipulations of the physical object. After the animation is played once, the menu 1000 reappears to allow the user to start another recording session, or start over with a different physical object. Additionally, the menu 1000 has an animation option 1006 via which the user can toggle on/off the animation, or switch between animations corresponding to different interaction clips.

Dataset Formation

After the image recording process, the captured images of the user manipulating the physical object can be paired with respective frames of the previously recorded interaction clip. As discussed above, the interaction clip is initially recorded as a time series of pose frames $[f_1, f_2, \ldots, f_n]$, where each frame of the interaction clip includes a timestamp ($f_i \cdot t$), a hand joint positions ($f_i \cdot h$) of the hand and a position ($f_i \cdot pos$) and a rotation ($f_i \cdot rot$) of the virtual bounding box. However, in order to complete the hand-object interaction dataset, each pose frame $f_i$ must be associated with an image ($f_i \cdot g$) in which the user's hand is interacting with the corresponding physical object. At this stage, such images have been captured and can be paired with the pose frames pose frames $[f_1, f_2, \ldots, f_n]$.

Figure 14:
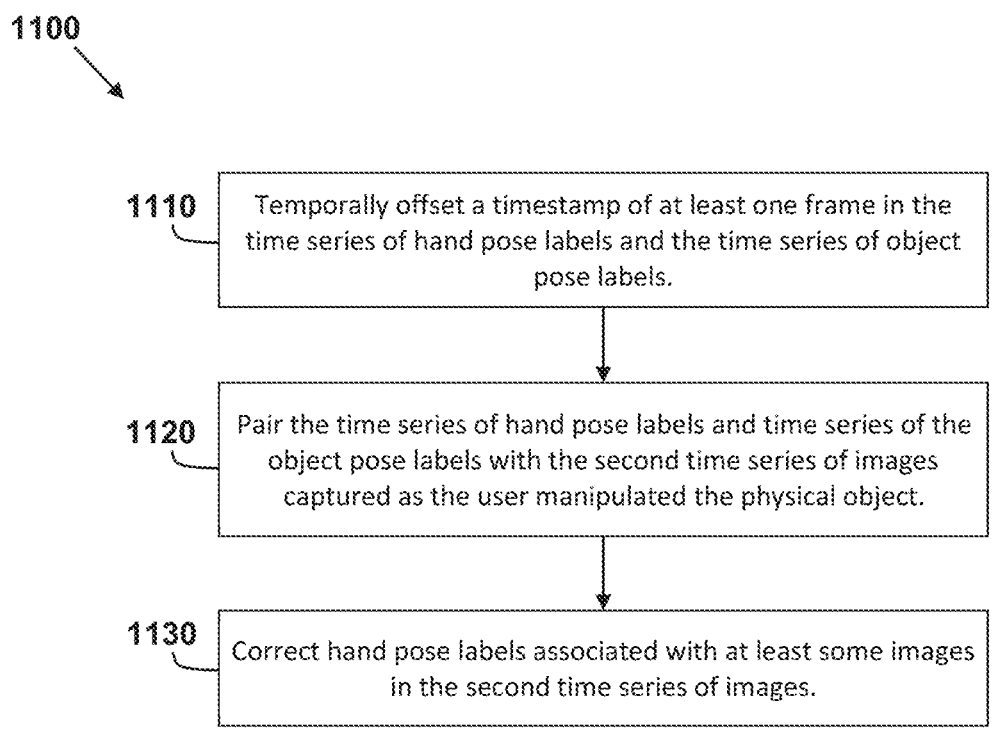
FIG. 14 shows a flow diagram for a method for dataset formation.

FIG. 14 shows a flow diagram for a method 1100 for dataset formation. The method 1100 is one exemplary embodiment of the dataset formation process (block 170) in which the dataset collection system 10 generates the hand-object interaction dataset, but also incorporates the image-label pair shift process (block 150) and the hand label correction process (block 160).

The method 1100 begins with temporally offsetting a timestamp of at least one frame in the time series of hand pose labels and the time series of object pose labels (block 1110). Particularly, after the image recording process, a straight-forward pairing images with the pose frames (i.e., the time series of hand pose labels and time series of the object pose labels) of the interaction clip may result in temporal mis-alignments due to the latency between a user's movement and the animated interaction clip during the image recording process. To this end, prior to pairing the time series of hand pose labels and time series of the object pose labels with the second time series of images, the processor 25 shifts at least one respective timestamp of the time series of hand pose labels and the time series of object pose labels by a respective time offset. The processor 25 determines the respective time offset based on a velocity of the time series of hand pose labels and the time series of object pose labels and based on a playback speed of the animation of the virtual bounding box during the image recording process.

In an exemplary embodiment, the processor 25 batches the recorded frames $[f_1, f_2, \ldots, f_n]$ of the interaction clip as $[b_1, \ldots, b_{n/k}]$, where each batch $b_i$ contains k consecutive frames, denoted as $[f_{i1}, f_{i2}, \ldots, f_{ik}]$. For each batch $b_i$, the processor 25 calculates an average linear ($b_i \cdot v$) velocity and an average angular ($b_i \cdot \omega$) velocity. It should be appreciated that the batch velocity information ($b_i \cdot v$) and ($b_i \cdot \omega$) may have already been calculated in the interaction clip smoothing process. Accordingly, in such cases, the information can simply be reused. Next, the processor 25 determines whether the replaying linear/angular velocity ($b_i \cdot vel * r_{global}$) exceeds a corresponding velocity threshold, $vel_{max}(vel \in \{v, \omega\})$. Here, $r_{global}$ is the playback speed of the animation of the virtual bounding box that was selected by the user during the image recording process and may, for example, have a value $r_{global} \in (0.5, 1.5)$. If the replaying linear/angular velocity ($b_i \cdot vel * r_{global}$) exceeds the corresponding velocity threshold, $vel_{max}(vel \in \{v, \omega\})$, then the processor 25 determines a respective time offset $\delta t = (b_i \cdot vel * r_{global} - vel_{max}) *$ ratio for the respective batch. In one embodiment, the dataset collection system 10 sets the ratio value to 20. The processor 25 adds the respective time offset $\delta t$ to the timestamps ($b_i \cdot t$) of the hand pose labels and object pose labels within that respective batch, to proportionally temporally shift the labels.

The method 1100 continues pairing the time series of hand pose labels and time series of the object pose labels with the second time series of images captured as the user manipulated the physical object (block 1120). Particularly, the processor 25 pairs each respective image from the second time series of images with a respective pose frame $f_i$ of the interaction clip, based on the timestamp of the respective pose frame $f_i$ and a timestamp of the respective image. In this way, an image ($f_i \cdot g$) in which the user's hand is interacting with the corresponding physical object, is associated with each pose frame $f_i$ of the interaction clip, thereby forming the hand-object interaction dataset.

Finally, the method 1100 continues with correcting hand pose labels associated with at least some images in the second time series of images (block 1130). Particularly, in some frames in which a user's hand is mostly perpendicular to the AR-HMD 23, tiny spatial errors of the hand joint positions may cause some of the hand pose labels completely detach from the hand. To avoid such scenarios in the final hand-object interaction dataset, the processor 25 segments each respective image into a background and a foreground, based on depth information of the respective image. Next, the processor 25 determines, for each respective image, whether any hand pose labels (i.e., joints) in the respective pose frame that is paired with the respective image are located in a background of the respective image. In response to determining that a hand pose label in the respective pose frame is located in the background of the respective image, the processor 25 pairs the respective image with a different nearby pose frame of the interaction clip.

FIG. 15 shows pseudocode for an algorithm for matching an image with hand pose labels of a nearby pose frame. In summary, for each respective image, the processor 25 checks whether all of the labeled hand joints (e.g., all 21 joints) paired with the image fall into the foreground of the image. In response to at least one joint lying in the background, the processor 25 searches around the neighboring m pose frames, in case there is a better match between the image and the hand pose labels of a neighboring pose frame. The number of joints labels of the p-th pose frame ($f_p$·h) falling in the foreground of the q-th image ($f_q$·g) can be denoted as $Num_{qp}$. When searching for the alternative pose frame for the q-th image, the processor 25 first selects the neighboring pose frame with the maximum value of $$Num_{qj}\left(j \in \left\{q - \frac{m}{2}, \ldots, q + \frac{m}{2}\right\}\right).$$

In other words, the processor 25 selects the pose frame having the hand pose labels where the largest number of joints fall into the foreground of the image. Finally, the processor 25 pairs or repairs the image with the selected neighboring pose frame. In one embodiment, the value m value is empirically set to 8. Additionally, in one embodiment, in response to more than 3 joints labels lying in the background of the paired image, the processor 25 deletes the data from the hand-object interaction dataset. Finally, in some embodiments, the processor 25 checks whether the hand pose labels and/or the object pose labels of a pose frame lay outside of the paired image entirely. In response to such cases, the processor 25 deletes the data from the hand-object interaction dataset.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for collecting a hand-object interaction dataset, the method comprising:
   generating, with a processor, based on user inputs, a virtual bounding box for a physical object that is to be interacted with;
   displaying, on a display, an augmented reality (AR) graphical user interface including the virtual bounding box superimposed on a real-world environment;
   generating a time series of hand pose labels and a time series of object pose labels by capturing, with at least one camera, a first time series of images of manipulations of the virtual bounding box in which a user virtually grabs the virtual bounding box with their hand and manipulates the virtual bounding by moving their hand;
   capturing, with the at least one camera, a second time series of images of manipulations of the physical object in which the user physically grabs the physical object and mimics the manipulations of the virtual bounding box; and
   generating, with the processor, the hand-object interaction dataset by pairing the time series of hand pose labels and the time series of the object pose labels with the second time series of images.

2. The method according to claim 1, the generating the virtual bounding box further comprising:
   selecting, based on user inputs, at least one virtual three-dimensional shape;
   displaying, in the AR graphical user interface, the at least one virtual three-dimensional shape superimposed on the real-world environment;
   manipulating, based on user inputs, at least one of a size, orientation, and position of the at least one virtual three-dimensional shape in the AR graphical user interface; and
   defining the virtual bounding box for the physical object based on the at least one virtual three-dimensional shape, the virtual bounding box having bounding contours corresponding to the at least one virtual three-dimensional shape.

3. The method according to claim 1, the generating the virtual bounding box further comprising:
- generating at least one virtual marking based on hand motions performed by the user;
- displaying, in the AR graphical user interface, the at least one virtual marking superimposed on the real-world environment; and
- defining the virtual bounding box for the physical object based on the virtual markings, the virtual bounding box having virtual bounding contours corresponding to the at least one virtual marking.

4. The method according to claim 1, the generating the time series of hand pose labels and the time series of object pose labels further comprising:
- determining, with the processor, the time series of hand pose labels based on the first time series of images of the manipulations of the virtual bounding box; and
- determining, with the processor, the time series of object pose labels based on the time series of hand pose labels.

5. The method according to claim 1, the generating the time series of hand pose labels and the time series of object pose labels further comprising:
- displaying, in the AR graphical user interface, a real-time animation of the manipulations of the virtual bounding box corresponding to real-time motions of the user's hand based on the time series of hand pose labels.

6. The method according to claim 5, the generating the time series of hand pose labels and the time series of object pose labels further comprising:
- displaying, in real-time, in the AR graphical user interface, at least one graphical indicator that indicates whether the user is performing a particular hand pose with their hand.

7. The method according to claim 5, the generating the time series of hand pose labels and the time series of object pose labels further comprising:
- displaying, in the AR graphical user interface, at least one graphical indicator that indicates whether object pose labels in the time series of object pose labels have been generated with respect to a plurality of different target orientations of the virtual bounding box.

8. The method according to claim 5, the generating the time series of hand pose labels and the time series of object pose labels further comprising:
- displaying, in the AR graphical user interface, at least one graphical indicator that indicates a progress toward generating a target amount of the time series of hand pose labels and the time series of object pose labels.

9. The method according to claim 1 further comprising:
- temporally smoothing, with the processor, the time series of hand pose labels and the time series of object pose labels, prior to the capturing the second time series of images of the manipulations of the physical object.

10. The method according to claim 1, the capturing the second time series of images of manipulations of the physical object further comprising:
- displaying, in the AR graphical user interface, an animation of the virtual bounding box moving according to the previously performed manipulations of the virtual bounding box, the animation being determined based on the time series of object pose labels.

11. The method according to claim 10, the displaying the animation of the manipulations of the virtual bounding box further comprising:
- displaying, in the AR graphical user interface, a graphical representation of a particular hand pose with which the user is to physically grab the physical object to mimic the previously performed manipulations of the virtual bounding box.

12. The method according to claim 10, the capturing the second time series of images of manipulations of the physical object further comprising:
- adjusting, based on user inputs, a playback speed of the animation of the virtual bounding box.

13. The method according to claim 1, the generating the hand-object interaction dataset further comprising:
- shifting at least one respective timestamp of the time series of hand pose labels and the time series of object pose labels by a respective time offset, prior to pairing the time series of hand pose labels and time series of the object pose labels with the second time series of images.

14. The method according to claim 13, the generating the hand-object interaction dataset further comprising:
- determining the respective time offset based on a velocity of the time series of hand pose labels and the time series of object pose labels.

15. The method according to claim 1, wherein the time series of hand pose labels and time series of the object pose labels are organized into a plurality of pose frames, each respective pose frame of the plurality of pose frames having a respective timestamp, a respective set of hand pose labels, and a respective set of object pose labels.

16. The method according to claim 15, the generating the hand-object interaction dataset further comprising:
- pairing each respective image from the second time series of images with a respective pose frame of the plurality of pose frames, based on a timestamp of the respective image and the respective timestamp of the respective pose frame.

17. The method according to claim 16, the generating the hand-object interaction dataset further comprising:
- segmenting each respective image from the second time series of images into a background and a foreground, based on depth information of the respective image; and
- determine, for each respective image from the second time series of images, whether any hand pose labels from the respective pose frame that is paired with the respective image are located in the background of the respective image.

18. The method according to claim 17, the generating the hand-object interaction dataset further comprising:
- pairing, for each respective image from the second time series of images, the respective image with a different pose frame of the plurality of pose frames, in response to determining that a hand pose label in the respective pose frame that is paired with the respective image is located in the background of the respective image.

19. The method according to claim 1, wherein the processes of (i) generating the time series of hand pose labels and the further time series of object pose labels, (ii) capturing the second time series of images of manipulations of the physical object, and (iii) generating the hand-object interaction dataset, are repeated until the hand-object interaction dataset reaches a predetermined size.

20. The method according to claim 1 further comprising:
- training, using the hand-object interaction dataset, at least one machine learning model configured to (i) receive input images of hand-object interactions and (ii) generate hand pose labels and object pose labels for the input images.

* * * * *